US012405934B2

(12) United States Patent
Schillace et al.

(10) Patent No.: US 12,405,934 B2
(45) Date of Patent: Sep. 2, 2025

(54) STORING ENTRIES IN AND RETRIEVING INFORMATION FROM AN EMBEDDING OBJECT MEMORY

(71) Applicant: Microsoft Technology Licensing, LLC, Redmond, WA (US)

(72) Inventors: Samuel Edward Schillace, Portola Valley, CA (US); Umesh Madan, Bellevue, WA (US); Devis Lucato, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 82 days.

(21) Appl. No.: 18/122,563

(22) Filed: Mar. 16, 2023

(65) Prior Publication Data

US 2024/0202173 A1    Jun. 20, 2024

Related U.S. Application Data

(60) Provisional application No. 63/433,619, filed on Dec. 19, 2022.

(51) Int. Cl.
*G06F 16/21* (2019.01)
*G06F 16/245* (2019.01)
*G06F 16/2457* (2019.01)

(52) U.S. Cl.
CPC ...... *G06F 16/219* (2019.01); *G06F 16/24573* (2019.01)

(58) Field of Classification Search
None
See application file for complete search history.

(56) References Cited

U.S. PATENT DOCUMENTS

| 10,171,656 | B2 | 1/2019 | Pullamplavil |
| 10,950,231 | B1 | 3/2021 | Kockerbeck |
| 11,017,780 | B2 | 5/2021 | Steelberg |
| 11,095,468 | B1 | 8/2021 | Pandey et al. |
| 11,106,736 | B1 * | 8/2021 | Newman ............... G06F 16/284 |

(Continued)

OTHER PUBLICATIONS

International Search Report and Written Opinion received for PCT Application No. PCT/US2023/081290, Mar. 11, 2024, 17 pages.

(Continued)

*Primary Examiner* — Son T Hoang

(57) ABSTRACT

Methods, systems, and media for storing entries in and/or retrieving information from an embedding object memory are provided. In some examples, a content item is received that has content data. The content data associated with the content item may be provided to one or more semantic embedding models that generate semantic embeddings. From one or more of the semantic embedding models, one or semantic embeddings may be received. The one or more semantic embeddings may then be inserted into the embedding object memory. The semantic embeddings may be associated with respective indications corresponding to a reference to source data associated with the semantic embeddings. Further, the insertion may trigger a spatial storage operation to store a vector representation of the one or more semantic embeddings. A plurality of collections of stored embeddings may be received from the embedding object memory, based on a provided input, to determine an action.

20 Claims, 12 Drawing Sheets

(56) References Cited

U.S. PATENT DOCUMENTS

| | | | |
|---|---|---|---|
| 11,328,368 | B1 | 5/2022 | Labrie |
| 11,443,164 | B2 | 9/2022 | Dalli |
| 11,573,993 | B2 | 2/2023 | Nelson et al. |
| 11,605,387 | B1 | 3/2023 | Muralitharan |
| 11,823,477 | B1* | 11/2023 | Ramezani ............... G06F 16/24 |
| 2003/0115548 | A1 | 6/2003 | Melgar |
| 2014/0040262 | A1 | 2/2014 | Winter |
| 2016/0070911 | A1 | 3/2016 | Okereke |
| 2017/0212886 | A1 | 7/2017 | Sarikaya et al. |
| 2018/0060334 | A1* | 3/2018 | Jensen ............... G06F 16/3344 |
| 2018/0151081 | A1* | 5/2018 | Chen .................. G06F 16/3347 |
| 2019/0028520 | A1 | 1/2019 | Nawrocki |
| 2019/0384813 | A1 | 12/2019 | Mohamed |
| 2020/0133071 | A1 | 4/2020 | Dai |
| 2020/0311122 | A1 | 10/2020 | Ramamurthy et al. |
| 2020/0311162 | A1* | 10/2020 | Xu ...................... G06F 16/9536 |
| 2020/0403817 | A1 | 12/2020 | Daredia et al. |
| 2021/0109769 | A1 | 4/2021 | Chenguang |
| 2021/0117479 | A1 | 4/2021 | Liu |
| 2021/0182341 | A1 | 6/2021 | Mullins |
| 2021/0224336 | A1 | 7/2021 | Bright |
| 2021/0271707 | A1* | 9/2021 | Lin ....................... G06F 16/538 |
| 2021/0303638 | A1* | 9/2021 | Zhong ................. G06F 16/9535 |
| 2021/0342711 | A1* | 11/2021 | Mokeev ............. G06F 16/3347 |
| 2022/0100831 | A1* | 3/2022 | Moreno .................. G06F 16/21 |
| 2022/0101861 | A1 | 3/2022 | Antos |
| 2022/0198156 | A1 | 6/2022 | Rao |
| 2022/0199079 | A1 | 6/2022 | Hanson |
| 2022/0200934 | A1 | 6/2022 | Dutta |
| 2022/0342900 | A1 | 10/2022 | Basu |
| 2022/0358713 | A1 | 11/2022 | Krishnamurthy |
| 2022/0385758 | A1 | 12/2022 | Tadesse et al. |
| 2023/0035076 | A1 | 2/2023 | Wang |
| 2023/0111517 | A1 | 4/2023 | Anderson |
| 2023/0115420 | A1 | 4/2023 | Dabas |
| 2023/0135179 | A1 | 5/2023 | Mielke |
| 2023/0139347 | A1 | 5/2023 | Bondarenko |
| 2023/0142718 | A1* | 5/2023 | Asgekar ............ G06F 16/90335 |
| 2023/0153641 | A1 | 5/2023 | Manda et al. |
| 2023/0153700 | A1* | 5/2023 | Lindgren ............. G06F 16/245 |
| 2023/0155903 | A1 | 5/2023 | Song |
| 2023/0386469 | A1 | 11/2023 | Horton |
| 2024/0078376 | A1* | 3/2024 | Li .......................... G06F 16/583 |
| 2024/0136070 | A1* | 4/2024 | El Saadawi ....... G06F 16/90335 |
| 2024/0201959 | A1 | 6/2024 | Callegari |
| 2024/0202215 | A1* | 6/2024 | Shashanka ............ G06F 16/285 |
| 2024/0202451 | A1 | 6/2024 | Schillace |
| 2024/0202452 | A1 | 6/2024 | Schillace |
| 2024/0202460 | A1 | 6/2024 | Schillace |
| 2024/0202582 | A1 | 6/2024 | Schillace |
| 2024/0202584 | A1 | 6/2024 | Schillace |
| 2024/0205037 | A1 | 6/2024 | Callegari |

OTHER PUBLICATIONS

International Search Report and Written Opinion received for PCT Application No. PCT/US2023/082379, Apr. 22, 2024, 12 pages.

"Long-term Memory for AI," Vector Database for Vector Search, Pinecone Systems, Inc., retrieved from: https://www.pinecone.io/, Mar. 27, 2023, 10 pages.

Kan, "Not All Vector Databases Are Made Equal," Towards Data Science, Oct. 2, 2021, retrieved from: https://towardsdatascience.com/milvus-pinecone-vespa-weaviate-vald-gsi-what-unites-these-buzz-words-and-what-makes-each-9c65a3bd0696, Mar. 27, 2023, 15 pages.

Notice of Allowance mailed on Aug. 27, 2024, in U.S. Appl. No. 18/129,758, 12 pages.

Notice of Allowability mailed on Dec. 4, 2024, in U.S. Appl. No. 18/129,758, 5 pages.

Anonymous: "Is there way to submit a table as an JSON file?", Aug. 19, 2022, Retrieved from the Internet: URL: https://web.archive.org/web/20220819203852/https://community.openai.com/t/is-there-way-to-submit-a-table-as-an-json-file/5299, 1 page.

Anonymous: "OpenAI—Spreadsheet creator", Aug. 19, 2022, XP093140385, Retrieved from the Internet: URL: https://platform.openai.com/examples/default-spreadsheet-gen, 1 page.

Anonymous: "Skill Chaining—Wikipedia, the free encyclopedia", Nov. 27, 2015, Retrieved from the Internet: URL: https://web.archive.org/web/20151127070537/https://en.wikipedia.org/wiki/Skill_chaining, 1 page.

Beaumont, Romain., "Semantic search with embeddings: index anything", Dec. 1, 2020, Retrieved from the Internet: URL: https://web.archive.org/web/20221212165434/https://rom1504.medium.com/semantic-search-with-embeddings-index-anything-8fb18556443c, retrieved on Jan. 26, 2024, 27 pages.

Chan Irene, "How to Create Meetings Summaries with OpenAI GPT-3", Dec. 16, 2022, 04 pages.

Fukamizu, et al., "Generation High resolution 3D model from natural language by Generative Adversarial Network", arxiv.org, Cornell University Library, 201 Olin Library Cornell University Ithaca, NY 14853, Jan. 22, 2019, 9 pages.

Holovaty, Adrian: "Adventures in generating music via ChatGPT text prompts", Dec. 1, 2022, Retrieved from the Internet: URL: https://web.archive.org/web/20221217201750/https://www.holovaty.com/writing/chatgpt-music-generation/, 10 pages.

International Search Report and Written Opinion received for PCT Application No. PCT/US2023/081254, mailed on Apr. 10, 2024, 10 pages.

International Search Report and Written Opinion received for PCT Application No. PCT/US2023/081261, mailed on Feb. 12, 2024, 15 pages.

International Search Report and Written Opinion received for PCT Application No. PCT/US2023/081271, mailed on Mar. 13, 2024, 12 pages.

International Search Report and Written Opinion received for PCT Application No. PCT/US2023/081303, mailed on Mar. 26, 2024, 15 pages.

International Search Report and Written Opinion received for PCT Application No. PCT/US2023/081323, mailed on Mar. 13, 2024, 17 pages.

International Search Report and Written Opinion received for PCT Application No. PCT/US2023/081342, mailed on Mar. 26, 2024, 14 pages.

Konidaris, et al., "Skill Discovery in Continuous Reinforcement Learning Domains using Skill Chaining", Dec. 10, 2009, Retrieved from the Internet: URL: https://proceedings.neurips.cc/paper_files/paper/2009/file/e0cf1f47118daebc5b16269099ad7347-Paper.pdf, 9 pages.

Magnani, et al., "Semantic Retrieval at Walmart", Proceedings of the 59th ACM/IEEE Design Automation Conference, ACMPUB27, New York, NY, USA, Aug. 14, 2022, pp. 3495-3503.

Non-Final Office Action mailed on May 8, 2024, in U.S. Appl. No. 18/129,758, 21 pages.

T, Vincent., "GPT-3 and Code Generation—AI-enabled Instant Software Development", Jan. 12, 2021, retrieved from the Internet: URL: https://becominghuman.ai/gpt-3-and-cod e-generation-ai-enabled-instant-software-development-270795077cbd, 10 pages.

Non-Final Office Action mailed on Jan. 16, 2025, in U.S. Appl. No. 18/129,668, 22 pages.

Non-Final Office Action mailed on Mar. 20, 2025, in U.S. Appl. No. 18/129,697, 08 pages.

Notice of Allowance mailed on Feb. 12, 2025, in U.S. Appl. No. 18/129,758, 05 pages.

Non-Final Office Action mailed on Apr. 15, 2025, in U.S. Appl. No. 18/129,783, 40 pages.

Non-Final Office Action mailed on Apr. 18, 2025, in U.S. Appl. No. 18/129,772, 15 pages.

\* cited by examiner

STORING ENTRIES IN AND RETRIEVING INFORMATION FROM AN EMBEDDING OBJECT MEMORY

CROSS-REFERENCE TO RELATED APPLICATION

This application claims priority to U.S. Provisional Application No. 63/433,619, titled "STORING ENTRIES IN AND RETRIEVING INFORMATION FROM AN EMBEDDING OBJECT MEMORY," filed on Dec. 19, 2022, the entire disclosure of which is hereby incorporated by reference in its entirety.

BACKGROUND

Computing devices may be relied on to perform any of a variety of different tasks. Further, computing devices may receive large quantities of content information, such as from video inputs, audio inputs, data transmissions, applications being executed, etc. Some systems may categorize and store the large quantities of content information that computing devices receive to compare related content objects for further processing. For example, the systems may use keyword searches to iterate through each content object from the large quantities of content information to find which content objects are related to the keyword. However, keyword searches may not consider the abstract meaning behind content objects, and may therefore be relatively inaccurate. Further, storing and retrieving objects from large quantities of content information may be computationally inefficient, such as by requiring a relatively large amount of memory to store the content information that is to be searched upon.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure relate to methods, systems, and media for storing entries in and/or retrieving information from an embedding object memory.

In some examples, a content item (e.g., a document, a skill, data object, etc.) is received that has content data. The content data associated with the content item may be provided to one or more semantic embedding models that generate semantic embeddings. From one or more of the semantic embedding models, one or semantic embeddings may be received. The one or more semantic embeddings may then be inserted into the embedding object memory. The semantic embeddings may be associated with respective indications corresponding to a reference to source data associated with the semantic embeddings. Further, the insertion may trigger a spatial storage operation to store a vector representation of the one or more semantic embeddings. After the embeddings are stored, a plurality of collections of stored embeddings may be received from the embedding object memory, such as based on a provided input. Further, an action may be determined based on a subset of the collections of stored embeddings and the provided input. The subset of the collections of stored embeddings may be retrieved based on a similarity to the input embedding.

This summary is provided to introduce a selection of concepts in a simplified form that are further described below in the Detailed Description. This summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTION OF THE DRAWINGS

Non-limiting and non-exhaustive examples are described with reference to the following Figures.

DETAILED DESCRIPTION

Figure 1:
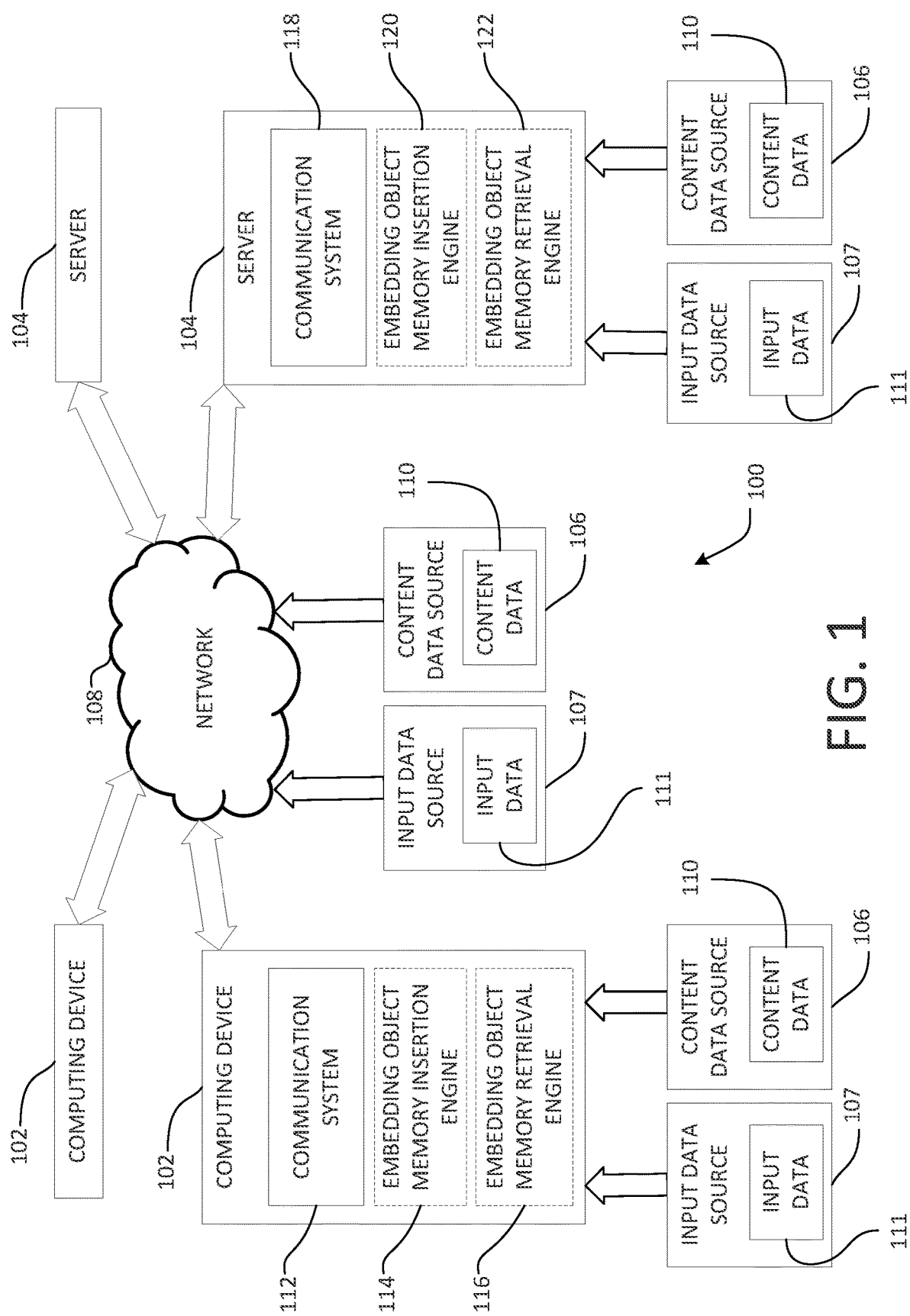
FIG. 1 illustrates an overview of an example system according to some aspects described herein.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

As mentioned above, computing devices may be relied on to perform any of a variety of different tasks. Further, computing devices may receive large quantities of content information, such as from video inputs, audio inputs, data transmissions, applications being executed, etc. Some systems may categorize and store the large quantities of content information that computing devices receive to compare related content objects for further processing. For example, the systems may use keyword searches to iterate through each content object from the large quantities of content information to find which content objects are related to the keyword. However, keyword searches may not consider the abstract meaning behind content objects, and may therefore be relatively inaccurate. Further, storing and retrieving objects from large quantities of content information may be computationally inefficient, such as by requiring a relatively large amount of memory to store the content information that is to be searched upon.

The content information discussed herein may be unstructured or semi-structured content, such as raw text or images. Standard Indexing techniques may be otherwise used for structured content, such as databases. Systems and methods provided herein may used for text and other unstructured content, which despite integration of statistics may fundamentally remain bag of words solutions (e.g., requiring instances of features associated with content to be individually identified, selected, and/or counted).

When building an operating system and/or kernel for semantic models (e.g., semantic embedding models) to perform actions in a system, the system may have the ability to learn skills and/or commands, such as by referencing external sources. The system may further have an embedding memory outside of a semantic model, such that semantic context can be built (e.g., in real-time). Further, the system may generate, launch and execute actions based on the embedding memory.

Recent advancements in artificial intelligence and machine-learning techniques allow for abstract meaning to be extracted from content objects in the form of embeddings that can be mathematically compared against the abstract meaning of other content objects in the form of embeddings, such that a quantitative similarity between the embeddings, and by consequence the content objects from which the embeddings were generated, can be determined. A similarity between content objects can provide semantic context to a computing device when determining if an action should be performed and/or what action should be performed.

Some examples provided herein relate to using a model and associated semantic embeddings to store entries in an embedding object memory that includes embeddings that correspond to content objects. A system hosting the model may be informed by semantic context and can look into the embedding object memory (e.g., a vectorized command store) to find matching content information by semantic address and/or semantic proximity (e.g., using cosine distance or another geometric n-dimensional distance function). In some examples, content objects themselves may be partitioned, sliced, and/or sub-divided by mechanisms provided herein to permit more fine-grained indexing and semantic proximity matching. This in turn can aid the discovery of useful overlap, similarity, and/or cross-connections (edges) with other content objects.

The embedding object memory may store embeddings associated with models and their specific versions, which may represent the same content information in different semantic embedding spaces. When a new model is added, a content object can be re-encoded (e.g., by generating a new embedding) in the new model semantic space to add to a collection of models. In this manner, a single content object may have a locatable semantic address across models. Storing and retrieving matching content objects may require specific methodologies to ensure the content objects are available across models. The present disclosure discusses aspects of inserting entries into, retrieving information from, and rebalancing an embedding object memory.

In some examples, a hierarchy may be built of the collection of models. For example, the hierarchy may be a tree, graph, or another data structure that stores content. In some examples, not only can a content object be sub-divided into more granular pieces, but sets of related content objects (such as those related by topic, time of creation, or other properties recognized by those of ordinary skill in the art) can be aggregated. The aggregated content objects can form more general higher level layers of a data structure, such as a tree. AI models, such as those described herein, can used to create new aggregated or merged content (e.g., summary, notes, rewrites etc.) that captures higher level semantic meanings of the set below it into a single new object. The object can in turn turned into an embedding.

Some aspects of the present disclosure relate to methods, systems, and media for storing entries in an embedding object memory. Generally, one or more content items (e.g., emails, audio data, video data, messages, internet encyclopedia data, skills, commands, source code, programmatic evaluations, etc.) may be received. The one or more content items may include one or more content data (e.g., each email in the emails, each audio file in the audio data, each video file in the video data, each message in the messages, each page of the internet encyclopedia, etc.). One or more of the content data associated with the content item may be provided to one or more semantic embedding models (e.g., a generative large language model, machine-learning model, etc.) to generate one or more semantic embeddings. One or more semantic embeddings may be received from the one or more semantic embedding models. In this respect, the large quantities of information that a computing device receives may be converted to embeddings (e.g., semantic embeddings) that can be mathematically compared and that occupy a relatively smaller amount of memory than the large quantities of information themselves.

A collection of semantic embeddings may be associated with a respective semantic embedding model. For example, a first collection of embeddings may be associated with a first semantic embedding model of the one or more semantic embedding models. Further, the collection of embeddings may include a first semantic embedding generated by the first semantic embedding model for at least one content data from the respective content item. In some examples, the semantic embedding models may be optimized for specific scenarios. For example, some semantic embedding models may be configured to produce embeddings with superior results for semantic proximity on certain object types, such as emails (e.g., for a specific user and/or organization). As another example, some semantic embedding models may be configured based on specific problem types (e.g., finding documents with 3-4 word topic summaries that are relatively close based on semantic similarity). The semantic embeddings models that are optimized for specific scenarios may generate embeddings that are relatively smaller or relatively larger than other semantic embedding models that are not configured for the specific scenarios. In some examples, hints may be provided to the semantic embedding models, such as to configure the models for the specific scenarios. The hints may be provided by a user and/or by an automated system, such as to provide options or strategies related to an input provided to the models.

The one or more semantic embeddings received from the semantic embedding models may be inserted into the embedding object memory. The one or more semantic embeddings may be associated with a respective indication corresponding to a location of source data associated with the one or more semantic embeddings. Further, the insertion may trigger a spatial storage operation to store a vector representation of the one or more semantic embeddings. The vector representation may be stored in at least one of an approximate nearest neighbor (ANN) tree, a k-dimensional (k-d) tree, an octree, an n-dimensional tree, or another data structure that may be recognized by those of ordinary skill in the art at least in light of teachings described herein.

Additionally, or alternatively, some aspects of the present disclosure relate to methods, system, and media for retrieving information from an embedding object memory. Generally, an input embedding may be received that is generated by a machine-learning model. The input embedding is discussed in further detail later herein. A plurality of collections of stored embeddings may be retrieved by mechanisms described herein. The plurality of collections of embeddings may each correspond to respective content data. A subset of embeddings from at least one of the plurality of collections of stored embeddings may be retrieved based on a similarity to the input embedding. Further, an action may be determined based on the subset of embeddings and the input embedding.

In some examples, the embedding object memory may contain tuples that include the stored embeddings, such as {value, embedding} or {key, embedding}. In such examples, the key, value, or an identification of original raw content associated with an embedding may be retrieved while the embedding stays buried within the store. Therefore, the closest embeddings to an input may be found and the associated key, value, identification, and/or reference may be returned.

In some examples, original content, such as from which embeddings are generated, can be thrown away. If the embedding is generated using an auto-encoder, then given the encoding for the content (e.g., embedding), the original content can be approximately regenerated using a decoder.

Some scenarios in which an embedding itself may be retrieved could include if given a set of objects, it is desirable to create a centroid (average) that represents the set of objects in average, as well as bounding coordinates that enclose a space in which the embeddings for the set of object reside. These scenarios may be useful for object aggregation and index building.

Advantages of mechanisms disclosed herein may include improved accuracy for comparing subsets of large quantities of content, such as by quantitatively comparing semantic embeddings corresponding to received content. Furthermore, mechanisms disclosed herein for storing entries in an embedding object memory can improve computational efficiency by, for example, reducing an amount of memory that is needed to track content (e.g., via feature vectors or embeddings, as opposed to audio files, video files, and/or encyclopedia pages themselves). Still further, mechanisms disclosed herein can improve computational efficiency for receiving content from an embedding object memory, such as by searching for semantic embeddings that may be categorized based on their source (e.g., type of data and/or application that generated the data), as opposed to searching through relatively large quantities of raw source data stored in memory.

FIG. 1 shows an example of a system 100, in accordance with some aspects of the disclosed subject matter. The system 100 may be a system for storing entries in an embedding object memory. Additionally, or alternatively, the system 100 may be a system for using an embedding object memory, such as by retrieving information from the embedding object memory. The system 100 includes one or more computing devices 102, one or more servers 104, a content data source 106, an input data source 107, and a communication network or network 108.

The computing device 102 can receive content data 110 from the content data source 106, which may be, for example a microphone, a camera, a global positioning system (GPS), etc. that transmits content data, a computer-executed program that generates content data, and/or memory with data stored therein corresponding to content data. The content data 110 may include visual content data, audio content data (e.g., speech or ambient noise), gaze content data, calendar entries, emails, document data (e.g., a virtual document), weather data, news data, blog data, encyclopedia data and/or other types of private and/or public content data that may be recognized by those of ordinary skill in the art. In some examples, the content data may include text, source code, commands, skills, or programmatic evaluations.

The computing device 102 can further receive input data 111 from the input data source 107, which may be, for example, a camera, a microphone, a computer-executed program that generates input data, and/or memory with data stored therein corresponding to input data. The content data 111 may be, for example, a user-input, such as a voice query, text query, etc., an image, an action performed by a user and/or a device, a computer command, a programmatic evaluation, or some other input data that may be recognized by those of ordinary skill in the art.

Additionally, or alternatively, the network 108 can receive content data 110 from the content data source 106. Additionally, or alternatively, the network 108 can receive input data 111 from the input data source 107.

Computing device 102 may include a communication system 112, an embedding object memory insertion engine or component 114, and/or an embedding object memory retrieval engine or component 116. In some examples, computing device 102 can execute at least a portion of the embedding object memory insertion component 114 to generate collections of embeddings corresponding to one or more subsets of the received content data 110 to be inserted into an embedding object memory. For example, each of the subsets of the content data may be provided to a machine-learning model, such as a natural language processor and/or a visual processor, to generate a collection of embeddings. In some examples, the subsets of content data may be provided to another type of model, such as a generative large language model (LLM).

Further, in some examples, computing device 102 can execute at least a portion of the embedding object memory retrieval component 116 to retrieve a plurality of collections of stored embeddings from an embedding object memory, based on an input embedding (e.g., generated based on the input data 111), and determine an action. For example, a subset of embeddings may be retrieved from one or more collections of the plurality of collections of stored embeddings, based on a similarity to the input embedding, and the action may be determined based on the input embeddings and the subset of embeddings (e.g., as contextual information in determining an action based on the input embeddings).

Server 104 may include a communication system 118, an embedding object memory insertion engine or component 120, and/or an embedding object memory retrieval engine or component 122. In some examples, server 104 can execute at least a portion of the embedding object memory insertion component 120 to generate collections of embeddings corresponding to one or more subsets of the received content data 110 to be inserted into an embedding object memory.

For example, each of the subsets of the content data may be provided to a machine-learning model, such as a natural language processor and/or a visual processor, to generate a collection of embeddings. In some examples, the subsets of content data may be provided to a generative large language model (LLM).

Further, in some examples, server 104 can execute at least a portion of the embedding object memory retrieval component 122 to retrieve a plurality of collections of stored embeddings from an embedding object memory, based on an input embedding (e.g., generated based on the input data 111), and determine an action. For example, a subset of embeddings may be retrieved from one or more collections of the plurality of collections of stored embeddings, based on a similarity to the input embedding, and the action may be determined based on the input embeddings and the subset of embeddings (e.g., as contextual information in determining an action based on the input embeddings).

Additionally, or alternatively, in some examples, computing device 102 can communicate data received from content data source 106 and/or input data source 107 to the server 104 over a communication network 108, which can execute at least a portion of the embedding object memory insertion component 114 and/or the embedding object memory retrieval engine 116. In some examples, the embedding object memory insertion component 114 may execute one or more portions of methods/processes 400 and/or 700 described below in connection with FIGS. 4 and 7, respectively. Further in some examples, the embedding object memory retrieval component 116 may execute one or more portions of methods/processes 400 and/or 700 described below in connection with FIGS. 4 and 7, respectively.

In some examples, computing device 102 and/or server 104 can be any suitable computing device or combination of devices, such as a desktop computer, a vehicle computer, a mobile computing device (e.g., a laptop computer, a smartphone, a tablet computer, a wearable computer, etc.), a server computer, a virtual machine being executed by a physical computing device, a web server, etc. Further, in some examples, there may be a plurality of computing device 102 and/or a plurality of servers 104. It should be recognized by those of ordinary skill in the art that content data 110 and/or input data 111 may be received at one or more of the plurality of computing devices 102 and/or one or more of the plurality of servers 104, such that mechanisms described herein can insert entries into an embedding object memory and/or use the embedding object memory, based on an aggregation of content data 110 and/or input data 111 that is received across the computing devices 102 and/or the servers 104.

In some examples, content data source 106 can be any suitable source of content data (e.g., a microphone, a camera, a GPS, a sensor, etc.). In a more particular example, content data source 106 can include memory storing content data (e.g., local memory of computing device 102, local memory of server 104, cloud storage, portable memory connected to computing device 102, portable memory connected to server 104, etc.). In another more particular example, content data source 106 can include an application configured to generate content data. In some examples, content data source 106 can be local to computing device 102. Additionally, or alternatively, content data source 106 can be remote from computing device 102 and can communicate content data 110 to computing device 102 (and/or server 104) via a communication network (e.g., communication network 108).

In some examples, input data source 107 can be any suitable source of input data (e.g., a microphone, a camera, a sensor, etc.). In a more particular example, input data source 107 can include memory storing input data (e.g., local memory of computing device 102, local memory of server 104, cloud storage, portable memory connected to computing device 102, portable memory connected to server 104, privately-accessible memory, publicly-accessible memory, etc.). In another more particular example, input data source 107 can include an application configured to generate input data. In some examples, input data source 107 can be local to computing device 102. Additionally, or alternatively, input data source 107 can be remote from computing device 102 and can communicate input data 111 to computing device 102 (and/or server 104) via a communication network (e.g., communication network 108).

In some examples, communication network 108 can be any suitable communication network or combination of communication networks. For example, communication network 108 can include a Wi-Fi network (which can include one or more wireless routers, one or more switches, etc.), a peer-to-peer network (e.g., a Bluetooth network), a cellular network (e.g., a 3G network, a 4G network, a 5G network, etc., complying with any suitable standard), a wired network, etc. In some examples, communication network 108 can be a local area network (LAN), a wide area network (WAN), a public network (e.g., the Internet), a private or semi-private network (e.g., a corporate or university intranet), any other suitable type of network, or any suitable combination of networks. Communication links (arrows) shown in FIG. 1 can each be any suitable communications link or combination of communication links, such as wired links, fiber optics links, Wi-Fi links, Bluetooth links, cellular links, etc.

Figure 2:
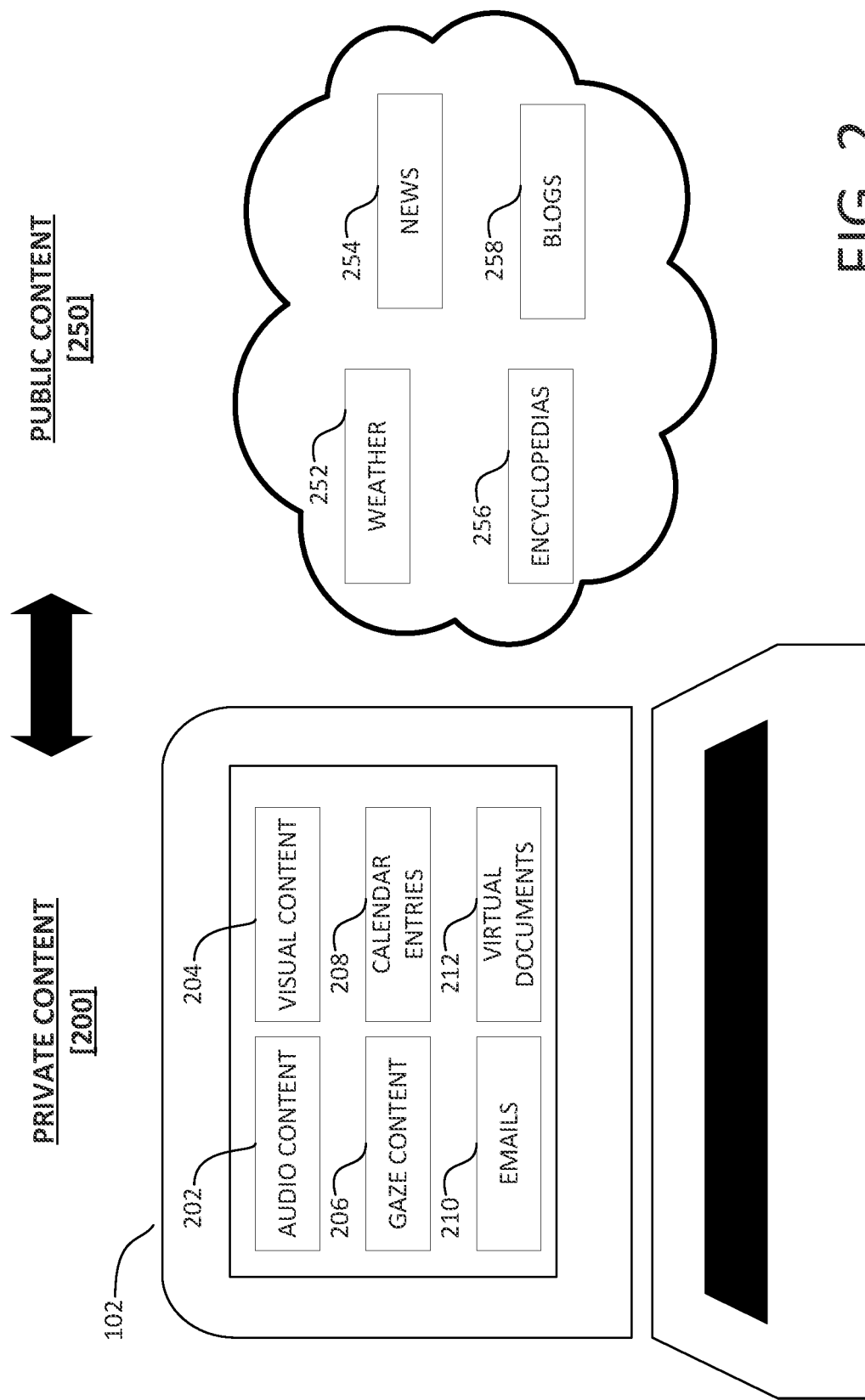
FIG. 2 illustrates examples of private content and public content, according to some aspects described herein.

FIG. 2 illustrates examples of content, such as private content 200 and public content 250, according to some aspects described herein. As discussed with respect to system 100, examples described may receive content data (e.g., content data 110) from a content data source (e.g., content data source 106). The content data that is received may include the private content 200 and/or public content 250. Additionally, or alternatively, the content data may include source code, commands, programmatic evaluations, or skills.

Generally, when a user is interacting with a computing device (e.g., computing device 102), they may be interacting with applications that are stored locally on the computing device and/or that can be executed locally on the computing device. Information that a user accesses or executes locally on their device may include the private content 200.

The private content includes audio content 202, visual content 204, gaze content 206, calendar entries 208, emails 210, and documents 212, as examples. Additional and/or alternative types of private content may be recognized by those of ordinary skill in the art.

The audio content 202 may include data corresponding to speech data that is generated. For example, the audio content 202 may be generated by the computing device 102 to correspond to audio that is received from a user (e.g., where the user is speaking into a microphone a computing device that may be separate from the computing device 102). Additionally, or alternatively, the audio content 202 may correspond to types of audio data that may be generated by a computing device, such as synthetic speech, animal sounds, beeps, buzzes, or another type of generated audio data.

The visual content 204 may include data corresponding to graphical content that may be displayed and/or generated by a computing device. For example, the visual content 204 may be content that is generated via an application being run on the computing device 102 (e.g., a web-browser, a presentation application, a teleconferencing application, a business management application, etc.). The visual content 204 may include data that is scraped from a screen display of the computing device 102. For example, any visual indication that is displayed on the computing device 102 may be included in the visual content 204.

The gaze content 206 may include data corresponding to where users are looking. For example, specific actions to be performed by a computing device may be associated with a specific location at which a user is looking and/or a combination of locations at which a user is looking within a predefined duration of time.

The calendar entries 208 may include calendar data specific to one or more users. For example, the calendar data may include meetings, appointments, reservations or other types of calendar entries. Additionally, or alternatively, the calendar data may include times, locations, attendees, and/or notes regarding specific calendar entries. Additional and/or alternative data associated with calendar entries may be recognized by those of ordinary skill in the art.

The emails 210 may include email data for one or more emails. For example, the emails 210 may include email data corresponding to a collection or plurality of emails. The email data may include senders and recipients, subjects, messages, images, timestamps, and/or other types of information that may be associated with emails. Additional and/or alternative data associated with calendar entries may be recognized by those of ordinary skill in the art.

The virtual documents 212 may include a type of document that is found in a virtual environment. For example, the virtual document 212 may be a text-editing document, a presentation, an image, a spreadsheet, an animated series of images, a notification, or any other type of virtual document that may be recognized by those of ordinary skill in the art.

In some examples, the virtual documents 212 may include interactive chats, such as chat communications between humans, between systems, and/or between humans and AI systems. Interactive chats may include dynamic streams of text that benefit from the integration of semantic memory described herein. To conduct a meaningful long running chat with the user, interaction history with an AI system (or any generated content), which is a sequence of objects, may be stored in a semantic object store, and then retrieved automatically and injected into the interactive chat's relevant history interface (e.g., a window on a computing device).

Each of the plurality of types of private content 200 may be subsets of the private content 200 that may be received by mechanisms described herein, as a subset of the content data 110. Further, while specific examples of types of private content have been discussed above, additional and/or alternative types of private content may be recognized by those of ordinary skill in the art.

The public content 250 includes weather 252, news 254, encyclopedias 256, blogs 258 and the like. The weather 252 may include information regarding weather that is around a user and/or at a location determined to be of interest for a user. For example, for a given time, weather information (e.g., precipitation, temperature, humidity, etc.) may be received or otherwise obtained for where a user is located (e.g., based on location content) and/or a location determined to be of interest to the user.

The news 254 may include information regarding recent news stories that are determined to be of interest to a user. For example, for a given time, a relatively recent news story covering a significant event may have been released. Additional or alternative types of news stories may include holidays, birthdays, local events, national events, natural disasters, celebrity updates, scientific discoveries, sports updates, or any other type of news that may be recognized by those of ordinary skill in the art.

The encyclopedia 256 may include publicly available encyclopedia information. For example, the encyclopedia 256 may include information from an online database of encyclopedic information. Additionally, or alternatively, the encyclopedia 256 may include pages from an online encyclopedia website. Additional or alternative types of encyclopedia information may be recognized by those of ordinary skill in the art.

The blogs 256 may include information from blogs. For example, the blogs may include publicly available posts from users of a blog website and/or a social media platform. The blogs may be posted by, for example, famous people, such as chefs, politicians, actors, etc. Alternatively, the blogs may be posted by other users who post content online that may be publicly accessible by mechanisms disclosed herein.

Generally, the different content types discussed with respect to FIG. 2 provide various types of content that may be received or otherwise accessed by a computing device and that may be useful in providing contextual information for determining actions described herein. Further, while specific subsets of content were described above with respect to one of the private content 200 and the public content 250, it should be recognized that in some examples the subsets of content may instead be described with respect to the other of the private content 200 or the public content 250. Further, it is noted that additional and/or alternative types of private content 200 and/or public content 250 will be recognized by those of ordinary skill in the art.

Figure 3:
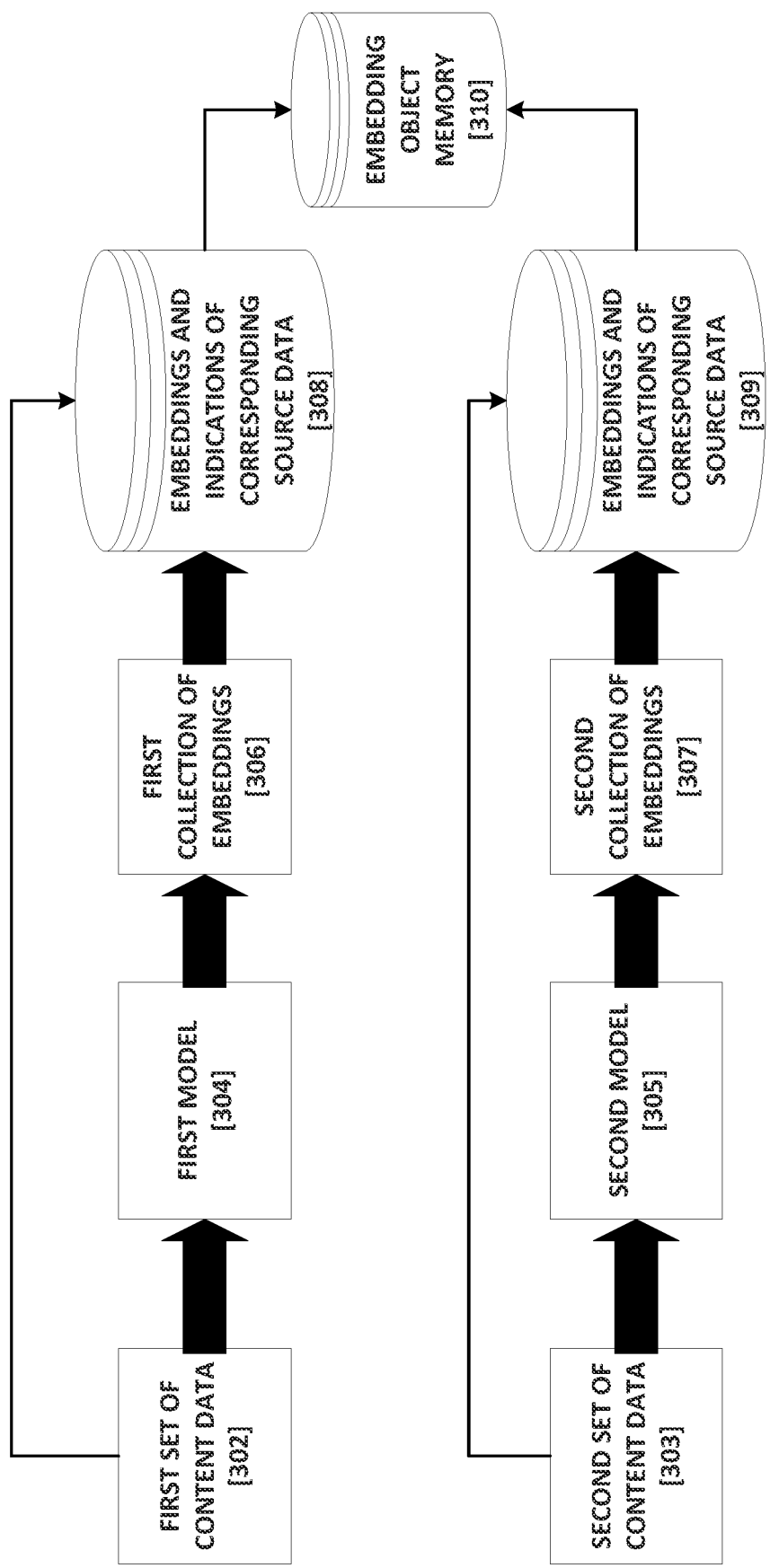
FIG. 3 illustrates an example flow of storing entries in an embedding object memory, according to some aspects described herein.

FIG. 3 illustrates an example flow 300 of storing entries in an embedding object memory. The example flow begins with a first set of content data 302 being received. The first set of content 302 may be received from a content data source, such as the content data source 110 described earlier herein with respect to FIG. 1. Further, the first set of content 302 may be one of private content or public content, such the private content 200 and/or the public content 250 described earlier herein with respect to FIG. 2. The first set of content 302 may include one or more content items or objects that include content data.

The first set of content data 302 may be input into a first model 304. For example, the first model 304 may include a machine-learning model, such as a machine-learning model that is trained to generate one or more embeddings, based on received content data. In some examples, the first model 304 includes a generative model, such as a generative large language model (LLM). In some examples, the first model 304 includes a natural language processor. Alternatively, in some examples, the first model 304 includes a visual processor. The first model 304 may be trained on one or more datasets that are compiled by individuals and/or systems. Additionally, or alternatively, the first model 304 may be trained based on a dataset that includes information obtained from the Internet. Further, the first model 304 may include a version. One of skill in the art will appreciate that any type of model may be employed as part of the aspects disclosed herein without departing from the scope of this disclosure.

The first model 304 may output a first collection of embeddings 306. The first collection of embeddings 306 may include one or more semantic embeddings. The first collection of embeddings 306 may be unique to the first model 304. Additionally, or alternatively, the first collection of embeddings 306 may be unique to the specific version of the first model 304. Each embedding in the first collection of embeddings 306 may correspond to a respective content object and/or respective content data from the first set of content data 302. Therefore, for each object and/or content data in the first set of content data 302, the first model 304 may generate an embedding.

Each of the embeddings in the first collection of embeddings 306 may be associated with a respective indication (e.g., byte address) corresponding to a location of source data associated with the embeddings. For example, if the first set of content data 302 corresponds to a set of emails, then the first collection of embeddings 306 may be hash values generated for each of the emails based on the content within the emails (e.g., abstract meaning of words or images included in the email). An indication corresponding to the location of an email (e.g., in memory) may then be associated with the embedding generated based off of the email. In this respect, the actual source data of a content object may be stored separately from the corresponding embedding that may occupy less memory.

The first collection of embeddings 306 and indications of corresponding source data associated with the first set of content data 302 (and thereby associated with the first collection of embeddings 306) may be stored together, such as in a first storage object 308. In some examples, the embeddings 306 and indications of corresponding source data may be stored in an embedding object memory 310. In some examples, the embeddings 306 may be a list of floating numbers, but the embeddings 306 may be linked to original source data associated with the embeddings 306 (e.g., the first set of content data 302), such that mechanisms provided herein can locate, retrieve, and/or otherwise access source data (e.g., an email thread, a text document, etc.) based on one or more embeddings from the embeddings 306.

The example flow 300 further includes with a second set of content data 303 being received. The second set of content data 303 may be received from a different content data source than the first set of content data 302. For example, the first set of content data 302 may be audio data and the second set of content data 303 may be video data. As another example, the first set of content data 302 may correspond to a first application (e.g., a word-processing application, a spreadsheet application, etc.) and the second set of content data 303 may correspond to a second application that is different than the first application. Additional and/or alternative combinations and examples of content data will be recognized by those of ordinary skill in the art.

The second set of content data 303 may be input into a second model 305. For example, the second model 305 may be a machine-learning model, such as a machine-learning model that is trained to generate one or more embeddings, based on received content data. In some examples, the second model 305 includes a generative model, such as a generative large language model (LLM). In some examples, the second model 305 includes a natural language processor. Alternatively, in some examples, the second model 305 includes a visual processor. The model may be trained on one or more datasets that are compiled by individuals and/or systems. Additionally, or alternatively, the second model 305 may be trained based on a dataset that includes information obtained from the Internet. Further, the second model 305 may include a version. One of skill in the art will appreciate that any type of model may be employed as part of the aspects disclosed herein without departing from the scope of this disclosure.

The second model 305 may output a second collection of embeddings 307. The second collection of embeddings 307 may include one or more semantic embeddings. The second collection of embeddings 307 may be unique to the second model 305. Additionally, or alternatively, the second collection of embeddings 307 may be unique to the specific version of the second model 305. For example, if the first model 304 and the second model 305 were both to receive the same set of content data, they may output different embeddings. Further, if a first version of the second model 305 received the same set of content data as a second version of the second model 305, then the first and second version of the second model 305 may output different collections of embeddings. Each embedding in the second collection of embeddings 307 may correspond to a respective content object and/or respective content data from the second set of content data 303. Therefore, for each object and/or content data in the second set of content data 303, the second model 305 may generate a respective embedding.

Each of the embeddings in the second collection of embeddings 307 may be associated with a respective indication (e.g., byte address, key, file name) corresponding to a location of source data associated with the embeddings. For example, if the second set of content data 303 corresponds to a set of encyclopedia data, then the second collection of embeddings 307 may be hash values generated for each of the pages of the encyclopedia based on the content within the pages (e.g., abstract meaning of words or images included in the pages). An indication corresponding to the location of the encyclopedia pages may then be associated with the embedding generated based off of the encyclopedia data. In this respect, the actual source data of a content object may be stored separately from the corresponding embedding that may occupy less memory.

The second collection of embeddings 307 and indications of corresponding source data associated with the second set of content data 303 (and thereby associated with the second collection of embeddings 307) may be stored together, such as in a second storage object 309. In some examples, the embeddings 307 and indications of corresponding source data may be stored in an embedding object memory 310. In some examples, the embeddings 307 may be a list of floating numbers, but the embeddings 307 may be linked to original source data associated with the embeddings 307 (e.g., the second set of content data 303), such that mechanisms provided herein can locate, retrieve, and/or otherwise access source data (e.g., an email thread, a text document, etc.) based on one or more embeddings from the embeddings 307.

Accordingly, the embedding object memory 310 may store a plurality of collections of embeddings (e.g., the first collection of embeddings 306 and the second collection of embeddings 307) with indications that correspond to locations of source data associated with the one or more embeddings. The plurality of collections of embeddings may be a plurality of semantic embeddings. The indications may be byte addresses, uniform resource indicators (e.g., uniform resource links), or another form of data that is capable of identifying a location of source data. The source data may be stored in memory of a computing device or server on which the embedding object memory 310 is located. Additionally, or alternatively, the source data may be stored in memory that is remote from a computing device or server on which the embedding object memory 310 is located.

Figure 4:
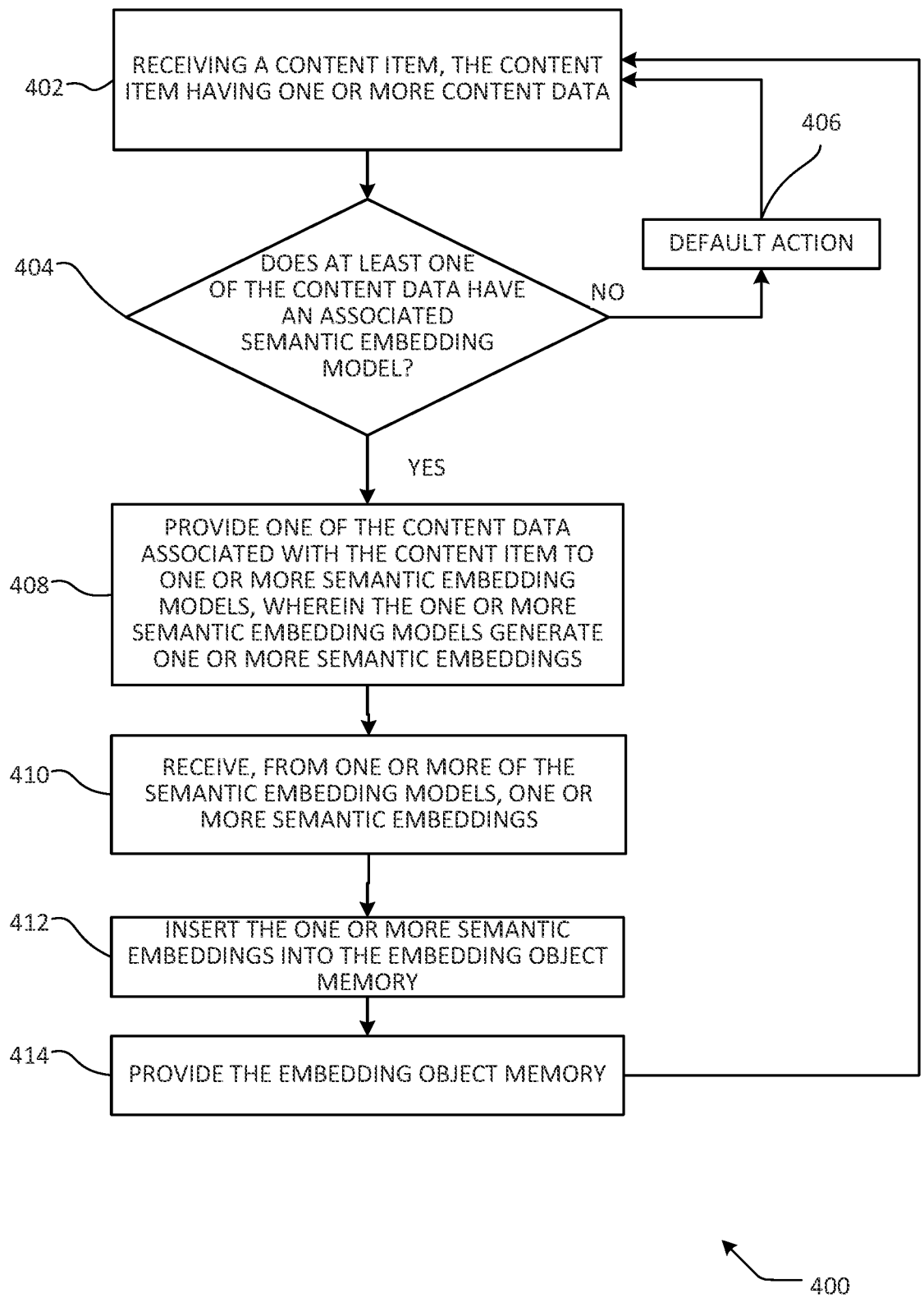
FIG. 4 illustrates an example method for storing entries in an embedding object memory, according to some aspects described herein.

FIG. 4 illustrates an example method 400 for storing an entry in an embedding object memory, according to some aspects described herein. In examples, aspects of method 400 are performed by a device, such as computing device 102 and/or server 104, discussed above with respect to FIG. 1.

Method 400 begins at operation 402 wherein one or more content items objects are received. The content items may have one or more content data. The one or more content data may include at least one public content data and/or at least one private content data. The content data may be similar to the content data 110 discussed with respect to FIG. 1. Additionally, or alternatively, the content data may be similar to the private content data 200 and/or public content data 250 discussed with respect to FIG. 2. In some examples, the content data may include at least one of a skill, command, or programmatic evaluation.

The content data may include one or more of audio content data, visual content data, gaze content data, calendar entries, emails, virtual documents, data generated by specific software applications, weather content data, news content data, encyclopedia content data, and/or blog content data. Additional and/or alternative types of content data may be recognized by those of ordinary skill in the art.

At operation 404, it is determined if at least one of the subsets of content data has an associated semantic embedding model. For example, the semantic embedding model may be similar to the first model 304 and/or the second model 305 discussed with respect to FIG. 3. The semantic embedding model may be trained to generate one or more embeddings, based on the at least one of the subsets of content data. In some examples, the semantic embedding model may include a natural language processor. In some examples, the semantic embedding model may include a visual processor. In some examples, the semantic embedding model may include a machine-learning model. Still further, in some examples, the semantic embedding model may include a generative large language model. The semantic embedding model may be trained on one or more datasets that are compiled by individuals and/or systems. Additionally, or alternatively, the semantic embedding model may be trained based on a dataset that includes information obtained from the Internet.

If it is determined that each of the content data do not have an associated semantic embedding model, flow branches "NO" to operation 406, where a default action is performed. For example, the content data and/or content items may have an associated pre-configured action. In other examples, method 400 may comprise determining whether the content data and/or content items have an associated default action, such that, in some instances, no action may be performed as a result of the received content items. Method 400 may terminate at operation 406. Alternatively, method 400 may return to operation 402 to provide an iterative loop of receiving one or more content items and determining if at least one of the content data of the content items have an associated semantic embedding model.

If however, it is determined that at least one of the content data have an semantic embedding model, flow instead branches "YES" to operation 408, where, one of the content data associated with the content item are provided to one or more semantic embedding models. The semantic embedding models generate one or more semantic embeddings. Further, the one or more semantic embedding models may include a version. Each of the semantic embeddings generated by the respective semantic embedding model may include metadata corresponding to the version of the semantic embedding model that generated the embedding. The embedding object memory may be associated with a versioned model store (or a service that stores the model and version, and can run inference processes based thereon).

In some examples, the content data is provided to the one or more semantic embedding models locally. In some examples, the content data is provided to the one or more semantic embedding model via an application programming interface (API). For example, a first device (e.g., computing device 102 and/or server 104) may interface with a second device (e.g., computing device 102 and/or server 104) via an API that is configured to provide embeddings or indications thereof, in response to receiving content data or indications thereof.

At operation 410, one or more semantic embeddings are received from one or more of the semantic embedding models. In some examples, the one or more semantic embeddings are a collection or plurality of embeddings. For example, a collection of embeddings (such as the first collection of embeddings 306) may be associated with a first semantic embedding model (e.g., the first model 304). In some examples, the collection of embeddings may be uniquely associated with the first semantic embedding model, such that a second semantic embedding model generates a different collection of embeddings than the first semantic embedding model. Further, in some examples, the collection of embeddings may be uniquely associated with the version of the first semantic embedding model, such that a different version of the first semantic embedding model generates a different collection of embeddings.

The collection of embeddings may include an embedding generated by the first semantic embedding model for at least one content data of a plurality of content data. For example, the content data may correspond to an email, an audio file, a message, a website page, etc. Additional and/or alternative types of content objects or items that correspond to the content data may be recognized by those of ordinary skill in the art.

At operation 412, the one or more semantic embeddings are inserted into the embedding object memory. In some examples, the semantic object memory may be an index, or a database, or a tree (e.g., ANN tree, k-d tree, etc.), or another type of memory that may be recognized by those of ordinary skill in the art. The embedding object memory includes one or more embeddings (e.g., semantic embeddings) from the collection of embeddings. Further, the one or more embeddings are associated with a respective indication that corresponds to a location of source data associated with the one or more embeddings. The source data can include one or more of audio files, text files, image files, video files, and/or website pages. Additional and/or alternative types of source data may be recognized by those of ordinary skill in the art. The embeddings may occupy relatively little memory. For example, each embedding may be a 64-bit hash. Comparatively, the source data may occupy a relatively large amount of memory. Accordingly, by storing an indication to the location of the source data in the embedding object memory, as opposed to the raw source data, mechanisms described herein may be relatively efficient for memory usage of one or more computing devices. In some examples, ordinary or cryptographic hashes may not be semantically useful for techniques provided herein because they do not support proximity search, and content may be distributed randomly all over a 64-bit space. However, in some examples, locality sensitive hashing (LSH) would be semantically useful.

The indications that corresponds to a location of source data may be byte addresses, uniform resource indicators (e.g., uniform resource links), or another form of data that is capable of identifying a location of source data. Further, the embedding object memory may be stored at a location that is different than the location of the source data. Additionally, or alternatively, the source data may be stored in memory of a computing device or server on which the embedding object memory (e.g., embedding object memory 310) is located. Additionally, or alternatively, the source data may be stored in memory that is remote from a computing device or server on which the embedding object memory is located.

In some examples, the insertion at operation 412 triggers a spatial storage operation to store a vector representation of the one or more embeddings (e.g., the one or more semantic embeddings). The vector representation may be stored in a data structure, such as an ANN tree, a k-d treen, an n-dimensional tree, an octree, or another data structure that may be recognized by those of ordinary skill in the art in light of teachings described herein. Additional and/or alternative types of storage mechanisms that are capable of storing vector space representations may be recognized by those of ordinary skill in the art.

At operation 414, the embedding object memory is provided. For example, the embedding object memory may be provided as an output for further processing to occur. In some examples, the embedding object memory may be used to retrieve information and/or generate an action, as will be described in some examples in further detail herein.

In some examples, the method 400 further includes providing an updated semantic embedding model to replace at least one of the semantic embedding models. The update semantic embedding model includes an updated version that is different than the version of the at least one of the semantic embedding models. From the updated semantic embedding model, an updated collection of embeddings may be received that correspond to the collections of embeddings that are generated by the at least one of the semantic embedding models. Further, the updated collection of embeddings may be stored in the embedding object memory with metadata that corresponds to the updated version.

In some examples a method for updating the embedding object memory based on adding or removing a model may be provided that is similar in concept to adding a new index to a database or a new search index to a data source. An example of such a method may include retrieving content data associated with a first collection of embeddings generated by a first model, inputting the retrieved content data into a second model (e.g., which is a new version of the first model) to generate a second collection of embeddings, wherein the first and second collection of embeddings are both retrievable with indications corresponding to the model by which they were generated. In some examples, mechanisms provided herein can crawl an original set of content data (a reference to which could be retained) and create a new embedding collection. In some examples, mechanisms provided herein can retrieve keys associated with each embedding, then retrieve the content data for each key, and create a new embedding. Such techniques can be helpful for object stores (e.g., a semantic object memory) with Get/Put semantics. Updating the embedding object memory may be easiest if raw content items are stored co-located with embeddings and/or embedding indexes.

Generally, embeddings may be used as quantitative representations of abstract meaning that is discerned from content data. Accordingly, different semantic embedding models may generate different embeddings for the same received content data, such as depending on how the semantic embedding models are trained (e.g., based on different data sets and/or training methods) or otherwise configured. In some examples, some semantic embedding models may be trained to provide relatively broader interpretations of received content than other semantic embedding models that are trained to provide relatively narrower interpretations of content data. The ability to provide relatively broader or narrower interpretations can also be accomplished via aggregation of the source objects (discussed earlier herein). Accordingly, such semantic embedding models may generate different embeddings.

In some examples, the method 400 further includes deleting the collection of embeddings that correspond to the updated collection of embeddings. The collection of embeddings include metadata the corresponds to a version that is different than the updated version. Generally, if a first version of a semantic embedding model is replaced with a second version of a semantic embedding model, then it may be efficient for memory storage to delete embeddings generated by the first version of the semantic embedding model since new embeddings may be stored that are generated by the second version of the semantic embedding model. For example, the embeddings generated by the second version of the semantic embedding model (e.g., a newer version) may be more desirable for use in further processing than the embeddings generated by the first version of the semantic embedding model (e.g., an older version).

One of ordinary skill in the art will recognize that in some examples embeddings may not be deleted, such as when it is not necessary or desirable to delete embeddings that correspond to different versions of a semantic embedding model. Further, in some examples, embeddings that correspond to different versions of a semantic embedding model may be stored in the embedding object memory with options to roll-back and/or roll-forward to different version of embeddings. For example, if a version of embeddings is corrupted or unusable, then it may be desirable to conduct further processing using a different version of embeddings that is accessible and/or useable.

Method 400 may terminate at operation 414. Alternatively, method 400 may return to operation 402 (or any other operation from method 400) to provide an iterative loop, such as of receiving one or more content items and inserting one or more semantic embeddings into an embedding object memory based thereon.

Figure 5:
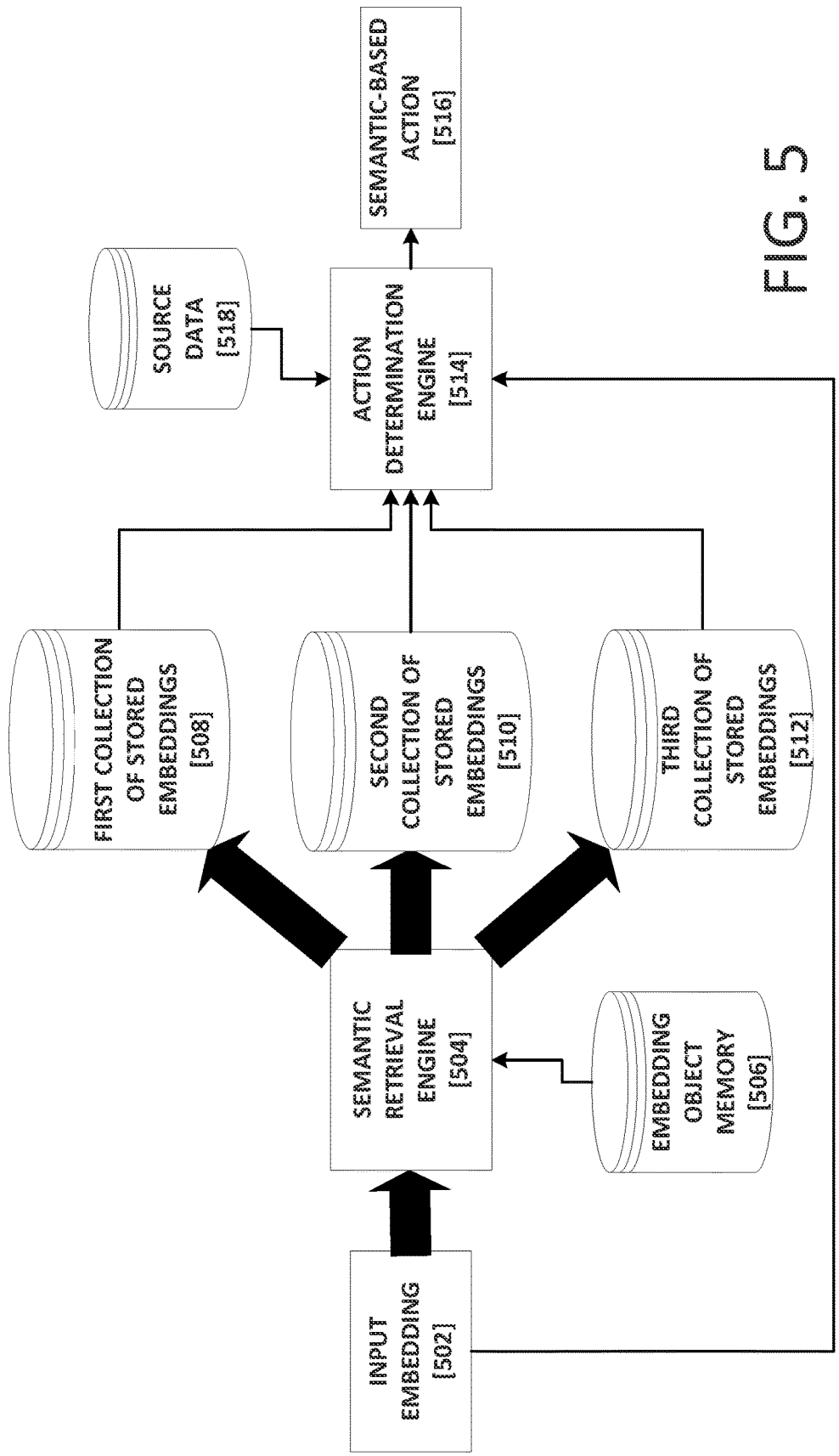
FIG. 5 illustrates an example flow for retrieving information from an embedding object memory, according to some aspects described herein.

FIG. 5 illustrates an example flow 500 for retrieving information from an embedding object memory, according to some aspects described herein. The example flow begins with receiving an input embedding 502. The input imbedding 502 may be generated by a model, such as a machine-learning model. For example, user-input may be received by a system and the user-input may be input into an embedding generator (e.g., a model, which may be similar to the first model 304 and/or the second model 305 described with respect to FIG. 3). The input embedding 502 may correspond to an intent of a user. For example, a user may intend to perform an action with their computing device, such as book a flight, or send an email, or create a presentation, or locate a file, or run a program. Additional and/or alternative intents that a user has with respect to a computing device may be recognized by those of ordinary skill in the art.

In some examples, the input embedding 502 may be generated based on something other than user-input. For example, the input embedding 502 may be generated based on an algorithm that triggers the input embedding 502 to be generated. Additionally, or alternatively, the input embedding 502 may be generated based on an audio and/or visual input that is received by a computer (e.g., independent from user-input). In some example, the input embedding 502 may be generated by a natural language processor, or a visual processor, or a generative large language model. Additional and/or alternative methods for generating the input embedding 502 may be recognized by those of ordinary skill in the art.

The input embedding 502 may be input into a semantic retrieval engine 504. The semantic retrieval engine or component 504 may include hardware and/or software that retrieves, from a embedding object memory 506 (e.g., which may be similar to the embedding object memory provided by method 400), a plurality of collections of stored embeddings, such as a first collection of stored embeddings 508, a second collection of stored embeddings 510, and a third collection of stored embeddings 512. The first, second, and third collections of stored embeddings 508, 510, and 512 may each be retrieved based on the input embedding 502.

Each of the collections of stored embeddings 508, 510, 512 may correspond to respective content data, such as content data 110, private content data 200, and/or public content data 250. For example, the first collection of stored embeddings 508 may include embeddings (e.g., semantic embeddings) that correspond to calendar invites, the second collection of stored embeddings 510 may include embeddings (e.g., semantic embeddings) that correspond to emails, and the third collection of stored embeddings 512 may include embeddings (e.g., semantic embeddings) that correspond to audio files. Additional and/or alternative content types to which the collections of stored embeddings 508, 510, and 512 correspond may be recognized by those of ordinary skill in the art.

A subset of embeddings may be retrieved from at least one of the plurality of collections of stored embeddings 508, 510, 512 based on a similarity to the input embedding 502. For example, embeddings that correspond to one or more emails, one or more calendar invites, one or more audio files, one or more video files, etc. may be received from respective collections of stored embeddings, such as the plurality of collections of stored embeddings 508, 510, 512.

In some examples, a respective similarity between the input embedding and each embedding of the plurality of collections of stored embeddings may be determined. The determined similarities may be compared to a predetermined threshold. Further, the subset of embeddings with similarities to the input embedding that are less than the predetermined threshold may be retrieved. Therefore, subsets of embeddings from at least one of the collections of embeddings that are determined to be related to the input embedding may be retrieved. Mechanisms for determining a similarity of embeddings to the input embeddings are discussed in further detail with respect to the vector space 600 of FIG. 6.

In some examples, an ordered ranking of the similarities may be determined. For example, the similarities may be ordered (e.g., in an increasing or decreasing fashion) based on values associated with the determined similarities. Therefore, a subset of embeddings may be retrieved based on the ordered ranking (e.g., a specified number of top and/or bottom rankings may be retrieved). In some examples, a subset of semantic embeddings may be retrieved with similarities to the input embedding that are less than the predetermined threshold and/or based on the ordered ranking.

At action determination engine or component 514, a semantic-based action or action 516 is determined based on the subsets of embeddings (e.g., from the plurality of collections of stored embeddings 508, 510, 512) and the input embedding 502. The action 516 may further be determined based on source data 518. For example, mechanisms described herein may locate raw source data corresponding to the subset of embeddings (e.g., similar as to how, in FIG. 3, the first set of content data 302 may include raw source data associated with the embeddings 306). Mechanisms may further determine the action based on further analysis of the content of the raw source data. As discussed earlier herein, the source data may include one or more of audio files, text files, image files, video files, website pages, blog posts, data generated by specific software applications, etc.

The semantic-based action may be any of a plurality of different actions. For example, the action may be an action that is performed by a user and/or by a system. The action may include instructions that are output to a user based on the input embedding 502 and the embedding object memory 506. Additionally or alternatively, the action may be performed automatically by a computing device (e.g., computing device 102). Some examples of actions include generating a draft email, sending a calendar invite, running a simulation, executing a specific set of operations via at least one processor, scheduling a meeting, booking a flight, leaving a voicemail, etc.

In one particular example, the input embedding 502 may be generated based on a user-input indicating "I want to book a flight." Based on the input embedding 502, mechanisms described herein may retrieve a plurality of collections of stored embeddings that correspond to emails, audio message, and calendar invites. A subset of the email embeddings may correspond to email source data content such as "I look forward to meeting you in New York next Thursday." A subset of audio messages may correspond to audio source data content such as "Let's plan something when you get back from New York on Monday." A subset of calendar invites may correspond to calendar invite source data such as "Trip to the NYC office from Thursday to Monday." Accordingly, based on the subset of embeddings, the intent embedding, and/or the source data, the semantic-based action may include automatically booking a flight to New York (e.g., departing Thursday and returning on Monday). Additionally, or alternatively, the action may include outputting a list of potential flights that a user may desire to book.

In another particular example, the input embedding 502 may be generated based on a system reading an email stating, "Please prepare a market analysis presentation for Client A." Based on the input embedding 502, mechanisms described herein may retrieve a plurality of collections of stored embeddings that correspond to web pages, news sources, emails, etc. A subset of the web page embeddings may correspond to source data that includes publicly available web pages about Client A and its competitors. A subset of the news source embeddings may correspond to source data that includes recent articles about Client A and/or its competitors. A subset of the email embeddings may correspond to source data that includes emails about the market sector in which Client A operates. Accordingly, based on the subset of embeddings, the intent embedding, and/or the source data, the semantic-based action may include generating a market analysis presentation. Additionally, or alternatively, the action may include generating graphics for a market analysis presentation. Additionally, or alternatively, the action may include outputting information that a user may rely on for creating a market analysis presentation.

While particular examples of actions have been provided above, the particular examples are merely examples. Additional and/or alternative examples should be recognized by those of ordinary skill in the art in light, at least in light of teachings provided herein.

Figure 6:
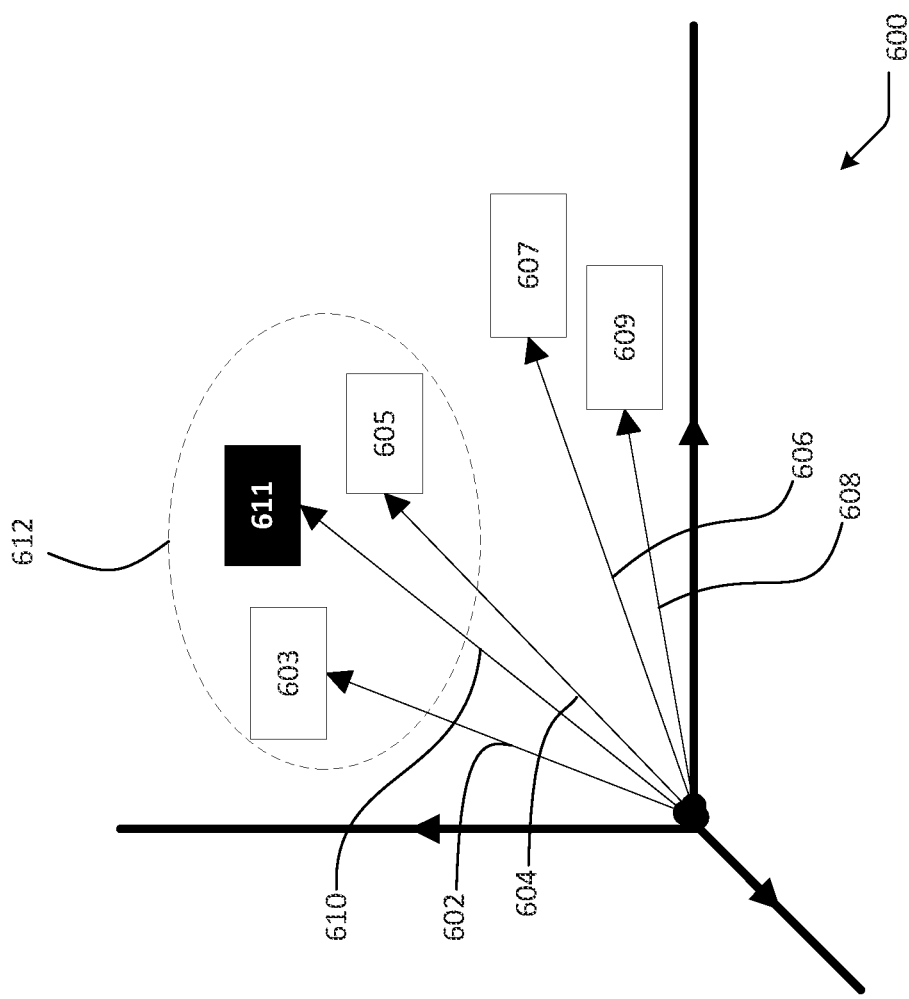
FIG. 6 illustrates an example vector space, according to some aspects described herein.

FIG. 6 illustrates an example vector space 600 according to some aspects described herein. The vector space 600 includes a plurality of feature vectors, such as a first feature vector 602, a second feature vector 604, a third feature vector 606, a fourth feature vector 608, and a fifth feature vector 610. Each of the plurality of feature vectors 602, 604, 606, and 608 correspond to a respective embedding 603, 605, 607, 609 generated based on a plurality of subsets of content data (e.g., subsets of content data 110, private content 200, and/or public content 250). The embeddings 603, 605, 607, and 609 may be semantic embeddings. The fifth feature vector 610 is generated based on an input embedding 611. The embeddings 603, 605, 607, 609 may be similar to the first collection of embeddings 306 and/or the second collection of embeddings 307, discussed with respect to FIG. 3. The input embedding 611 may be similar to the input embedding 502.

The feature vectors 602, 604, 606, 608, 610 each have distances that are measurable between each other. For example, a distance between the feature vectors 602, 604, 606, and 608 and the fifth feature vector 610 corresponding to the input embedding 611 may be measured using cosine similarity. Alternatively, a distance between the feature vectors 602, 604, 606, 608 and the fifth feature vector 610 may be measured using another distance measuring technique (e.g., an n-dimensional distance function) that may be recognized by those of ordinary skill in the art.

A similarity of each of the feature vectors 602, 604, 606, 608 to the feature vector 610 corresponding to the input embedding 611 may be determined, for example based on the measured distances between the feature vectors 602, 604, 606, 608 and the feature vector 610. The similarity between the feature vectors 602, 604, 606, 608 and the feature vector 610 may be used to group or cluster the feature vectors 602, 604, 606, and 608 in one or more collections of feature vectors, such as a collection 612, thereby generating a collection of embeddings.

In some examples, the collection 612 may include a predetermined number of feature vectors, such that groups of feature vectors are given a predetermined size. Additionally, or alternatively, in some examples, The distances between each of the feature vectors 602, 604, 606, 608 and the feature vector 610 corresponding to the input embedding 611 may be compared to a predetermined threshold.

The embeddings 603 and 605 that correspond to feature vectors 602 and 604, respectively, may fall within the same content group. For example, the embedding 603 may be related to a first email, and the embedding 605 may be related to a second email. Additional and/or alternative examples of content groups in which the embeddings may be categorized may be recognized by those of ordinary skill in the art.

The collection 612 may be stored in a data structure, such as an ANN tree, a k-d tree, an octree, another n-dimensional tree, or another data structure that may be recognized by those of ordinary skill in the art that is capable of storing vector space representations. Further, memory corresponding to the data structure in which the collection 612 is stored may be arranged or stored in a manner that groups the embeddings and/or vectors in the collection 612 together, within the data structure. In some examples, feature vectors and their corresponding embeddings generated in accordance with mechanisms described herein may be stored for an indefinite period of time. Additionally, or alternatively, in some examples, as new feature vectors and/or embeddings are generated and stored, the new feature vectors and/or embeddings may overwrite older feature vectors and/or embeddings that are stored in memory (e.g., based on metadata of the embeddings indicating a version), such as to improve memory capacity. Additionally, or alternatively, in some examples, feature vectors and/or embeddings may be deleted from memory at specified intervals of time, and/or based on an amount of memory that is available (e.g., in the embedding object memory 310), to improve memory capacity.

Generally, the ability to store embeddings corresponding to received content data allows a user to associate and locate data in a novel manner that has the benefit of being computationally efficient. For example, instead of storing a video recording of a screen of a computing device, or web pages on the Internet, a user may instead store, using mechanisms described herein, embeddings corresponding to content objects. The embeddings may be hashes, as opposed to, for example, video recordings that may be a few hundreds of thousands of pixels, per frame. Therefore, the mechanisms described herein are efficiency for reducing memory usage, as well as for reducing usage of processing resources to search through stored content. Additional and/or alternative advantages may be recognized by those of ordinary skill in the art.

Figure 7:
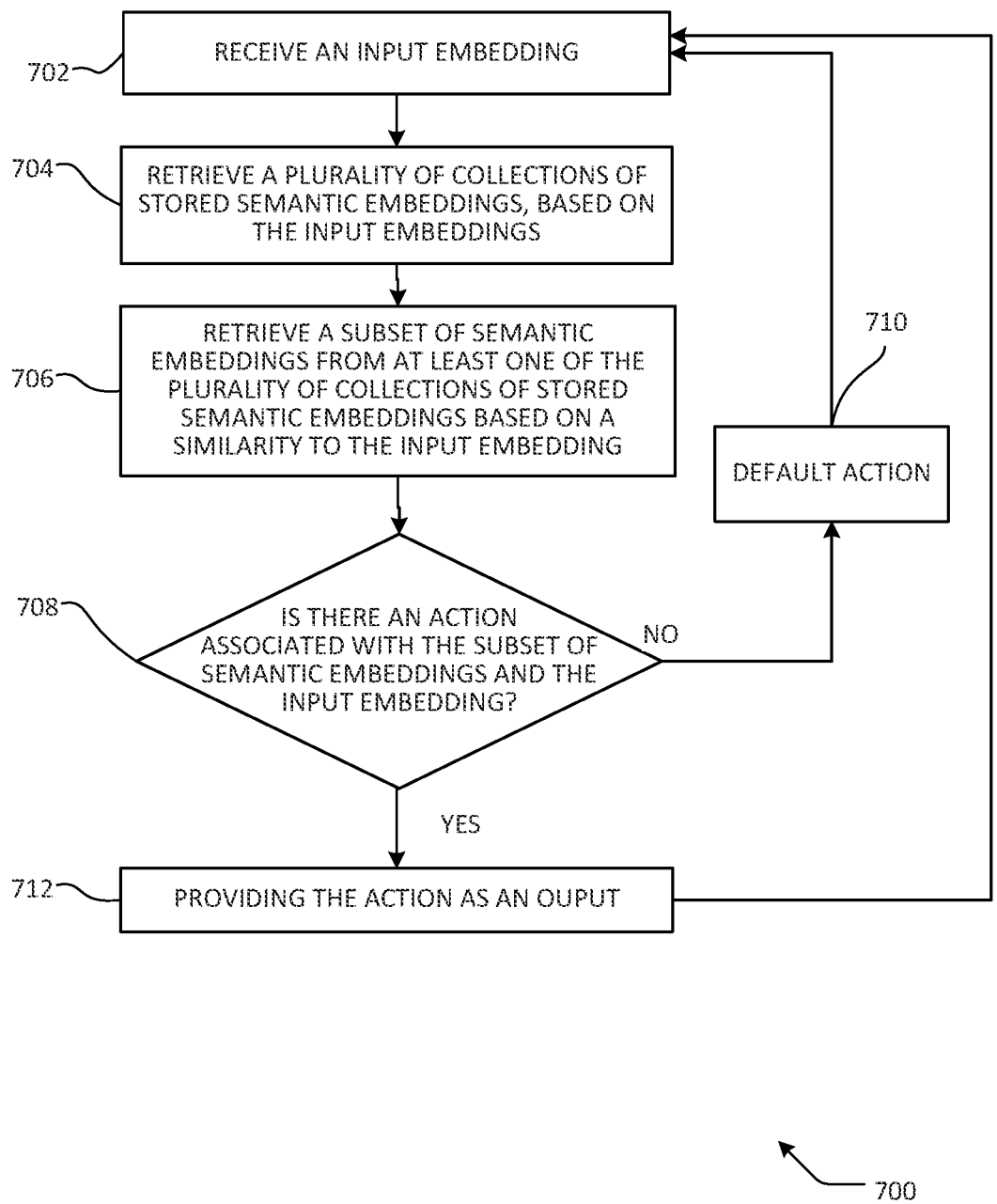
FIG. 7 illustrates an example method for retrieving information from an embedding object memory, according to some aspects described herein.

FIG. 7 illustrates an example method 700 for retrieving information from an embedding object memory, according to some aspects described herein. In examples, aspects of method 700 are performed by a device, such as computing device 102 and/or server 104, discussed above with respect to FIG. 1.

Method 700 begins at operation 702 wherein an input embedding is received. The input imbedding may be generated by model, such as a machine-learning model. For example, user-input may be received and the input embedding may be generated based on the user-input. The input embedding 502 may correspond to an intent of a user. For example, a user may intend to perform an action with their computing device, such as book a flight, or send an email, or create a presentation, or locate a file, or run a program. Additional and/or alternative intents that a user has with respect to a computing device may be recognized by those of ordinary skill in the art.

In some examples, the input embedding may be generated based on something other than user-input. For example, the input embedding may be generated based on an algorithm that triggers the input embedding to be generated. Additionally, or alternatively, the input embedding may be generated based on an audio and/or visual input that is received by a computer (e.g., independent from user-input). Additional and/or alternative methods for generating the input embedding, such as based on received and/or generated data, may be recognized by those of ordinary skill in the art.

At operation 704, a plurality of collections of stored embeddings (e.g., semantic embeddings) are retrieved. The plurality of collections of stored embeddings may be retrieved from an embedding object memory (e.g., the embedding object memory provided by method 400 illustrated in FIG. 4). The plurality of collections of stored embeddings may be retrieved based on and/or in response to the input embedding. Each of the plurality of collections of stored embeddings may correspond to respective content data, such as content data 110, private content data 200, and/or public content data 250. For example, the collections of stored embeddings may include embeddings that correspond to calendar invites, emails, audio files, and/or data generated by specific software applications. Additional and/or alternative content types to which the collections of stored embeddings correspond may be recognized by those of ordinary skill in the art.

At operation 706, a subset of embeddings (e.g., subset of semantic embeddings) from at least one of the plurality of collections of stored embeddings are retrieved. For example, the subset of embeddings may be retrieved based on a similarity to the input embedding. A respective similarity between the input embedding and each embedding of the plurality of collections of stored embeddings may be determined. For example, the similarity may be based on a distance between the embeddings in a vector space, such as the vector space 600 described with respect to FIG. 6. Each of the similarities may be compared to a predetermined threshold, such that if a subset of embeddings have similarities that are greater than and/or less than the predetermined threshold, the subset of embeddings may be retrieved. Therefore, the subsets of embeddings from at least one of the collections of embeddings that are determined to be related (e.g., significantly related, based on a comparison to the predetermined threshold) to the input embedding may be retrieved.

At operation 708, it is determined if there is an action associated with the subset of embeddings and the input embedding. For example, the action may be determined based on the subset of imbedding and the input embedding. In some examples, source data that is associated with the subset of embeddings may be located (e.g., local to a device on which method 700 is being executed and/or remote from a device on which method 700 is being executed) and the action may be further determined based on the source data. As discussed earlier herein, the source data may include one or more of audio files, text files, image files, video files, website pages, blog posts, news stories, data generated by specific software applications, etc.

If it is determined that there is not an action associated with the subset of embeddings, flow branches "NO" to operation 710, where a default action is performed. For example, the subset of embeddings may have an associated pre-configured action. In other examples, method 700 may comprise determining whether the subset of embeddings has an associated default action, such that, in some instances, no action may be performed as a result of the retrieved subset of embeddings. Method 700 may terminate at operation 710. Alternatively, method 700 may return to operation 702 to provide an iterative loop of receiving an input embedding, retrieving a plurality of collections of stored embeddings, retrieving a subset of embeddings from at least one of the plurality of collections of stored embeddings, and determining if there is an action associated with the subset of embeddings and the input embedding.

If however, it is determined that there is an action associated with the subset of embeddings and the input embedding, flow instead branches "YES" to operation 712, where the action is provided as an output. For example, the action may be provided as an output to a user, a system on which method 700 is being executed, and/or a system remote from that on which method 700 is being executed. Further, in some examples, the method 700 may further include adapting a computing device to perform the action that is provided.

The action may be any of a plurality of different actions. For example, the action may be an action that is performed by a user and/or by a system. The action may include instructions and/or information that are output to a user. Additionally or alternatively, the action may be performed automatically by a computing device (e.g., computing device 102). Some examples of actions include generating a draft email, sending a calendar invite, running a simulation, executing a specific set of operations via at least one processor, scheduling a meeting, booking a flight, leaving a voicemail, etc. While particular examples of actions have been provided herein, the particular examples are merely examples. Additional and/or alternative examples should be recognized by those of ordinary skill in the art, at least in light of teachings provided herein.

Figure 8A:
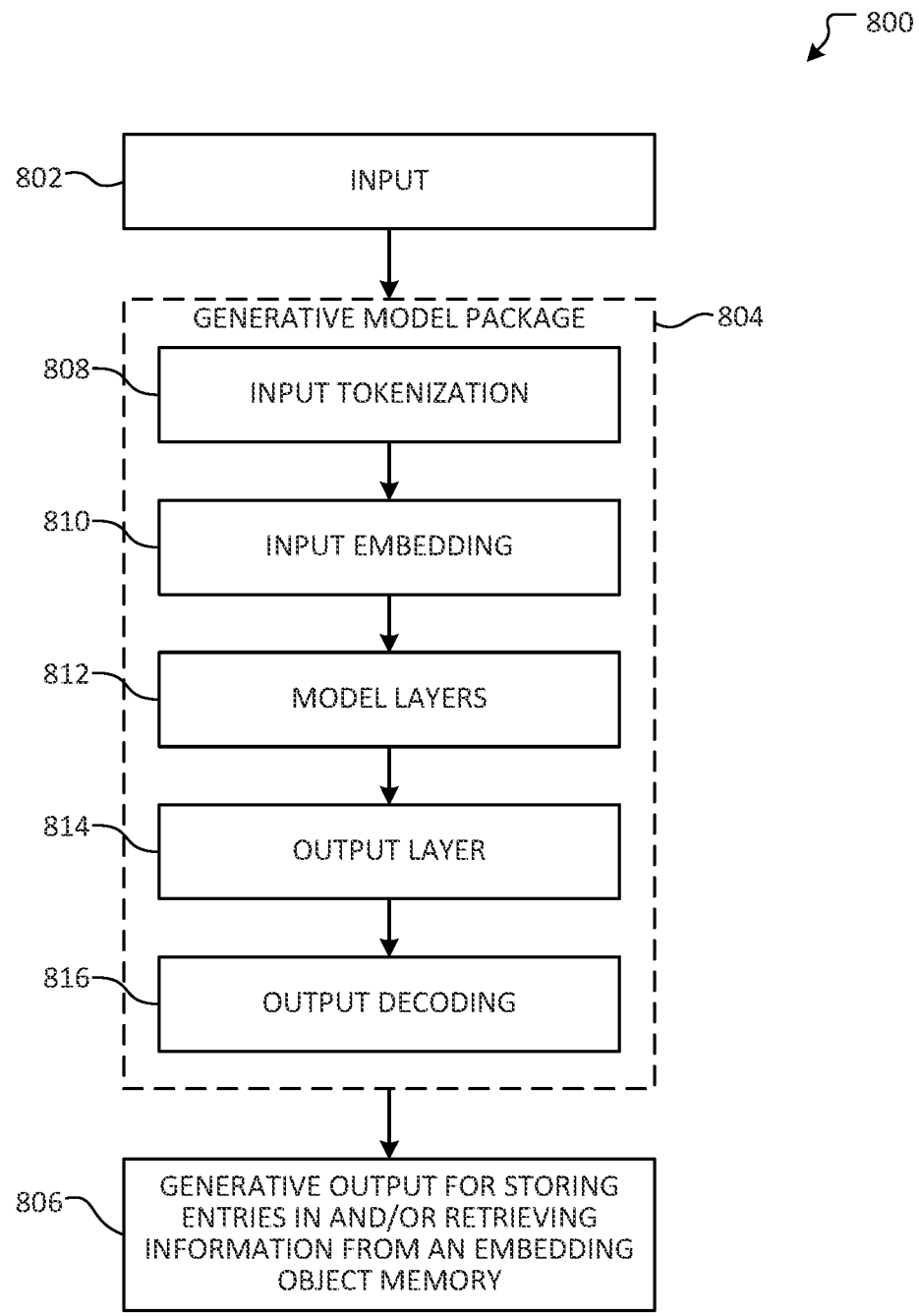
FIGS. 8A and 8B illustrate overviews of an example generative machine learning model that may be used according to aspects described herein.
Figure 8B:
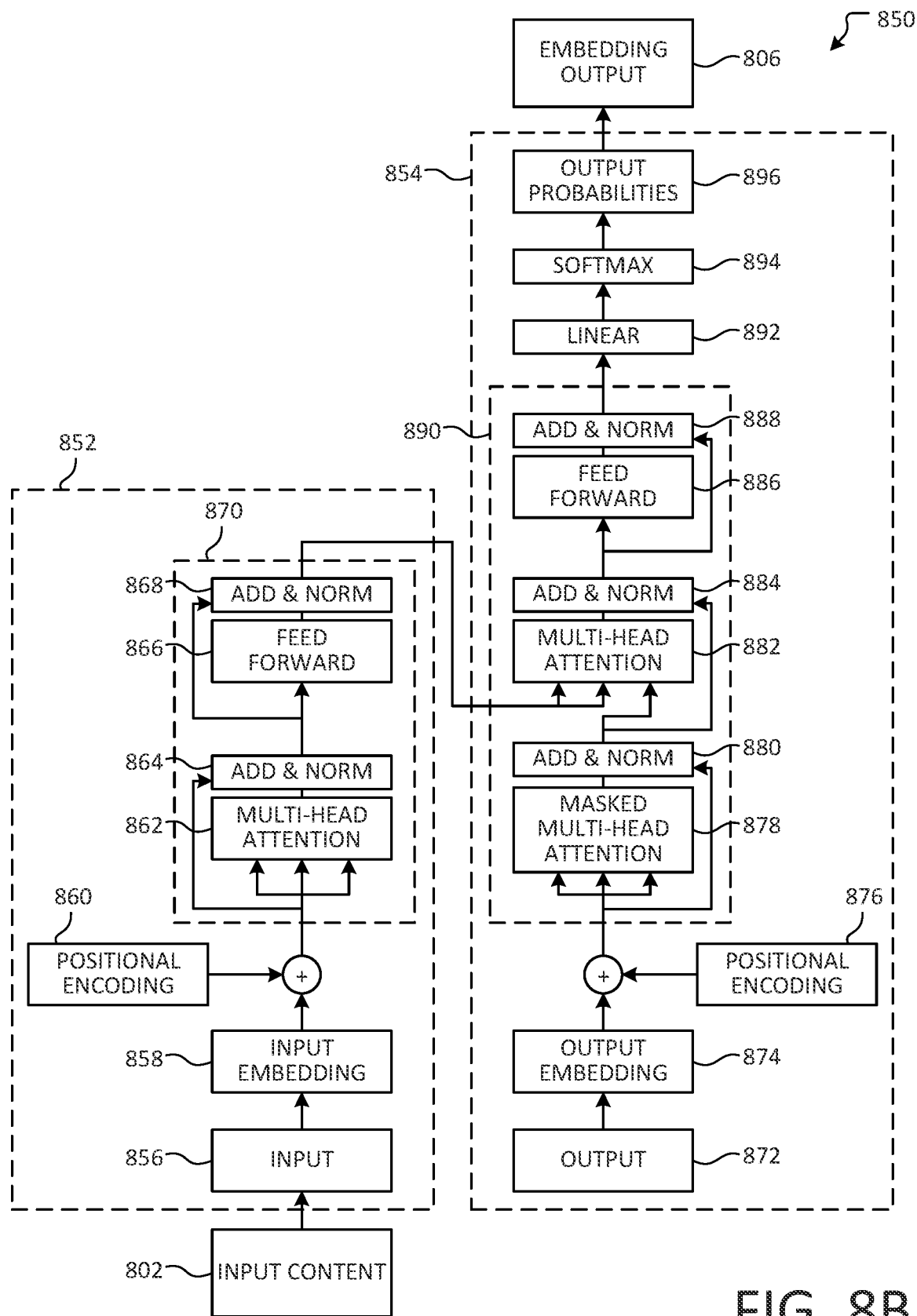

FIGS. 8A and 8B illustrate overviews of an example generative machine learning model that may be used according to aspects described herein. With reference first to FIG. 8A, conceptual diagram 800 depicts an overview of pre-trained generative model package 804 that processes an input 802 to generate model output for storing entries in and/or retrieving information from an embedding object memory 806 according to aspects described herein. Examples of pre-trained generative model package 804 includes, but is not limited to, Megatron-Turing Natural Language Generation model (MT-NLG), Generative Pre-trained Transformer 3 (GPT-3), Generative Pre-trained Transformer 4 (GPT-4), BigScience BLOOM (Large Open-science Open-access Multilingual Language Model), DALL-E, DALL-E 2, Stable Diffusion, or Jukebox.

In examples, generative model package 804 is pre-trained according to a variety of inputs (e.g., a variety of human languages, a variety of programming languages, and/or a variety of content types) and therefore need not be finetuned or trained for a specific scenario. Rather, generative model package 804 may be more generally pre-trained, such that input 802 includes a prompt that is generated, selected, or otherwise engineered to induce generative model package 804 to produce certain generative model output 806. For example, a prompt includes a context and/or one or more completion prefixes that thus preload generative model package 804 accordingly. As a result, generative model package 804 is induced to generate output based on the prompt that includes a predicted sequence of tokens (e.g., up to a token limit of generative model package 804) relating to the prompt. In examples, the predicted sequence of tokens is further processed (e.g., by output decoding 816) to yield output 806. For instance, each token is processed to identify a corresponding word, word fragment, or other content that forms at least a part of output 806. It will be appreciated that input 802 and generative model output 806 may each include any of a variety of content types, including, but not limited to, text output, image output, audio output, video output, programmatic output, and/or binary output, among other examples. In examples, input 802 and generative model output 806 may have different content types, as may be the case when generative model package 804 includes a generative multimodal machine learning model.

As such, generative model package 804 may be used in any of a variety of scenarios and, further, a different generative model package may be used in place of generative model package 804 without substantially modifying other associated aspects (e.g., similar to those described herein with respect to FIGS. 1-7). Accordingly, generative model package 804 operates as a tool with which machine learning processing is performed, in which certain inputs 802 to generative model package 804 are programmatically generated or otherwise determined, thereby causing generative model package 804 to produce model output 806 that may subsequently be used for further processing.

Generative model package 804 may be provided or otherwise used according to any of a variety of paradigms. For example, generative model package 804 may be used local to a computing device (e.g., computing device 102 in FIG. 1) or may be accessed remotely from a machine learning service. In other examples, aspects of generative model package 804 are distributed across multiple computing devices. In some instances, generative model package 804 is accessible via an application programming interface (API), as may be provided by an operating system of the computing device and/or by the machine learning service, among other examples.

With reference now to the illustrated aspects of generative model package 804, generative model package 804 includes input tokenization 808, input embedding 810, model layers 812, output layer 814, and output decoding 816. In examples, input tokenization 808 processes input 802 to generate input embedding 810, which includes a sequence of symbol representations that corresponds to input 802. Accordingly, input embedding 810 is processed by model layers 812, output layer 814, and output decoding 816 to produce model output 806. An example architecture corresponding to generative model package 804 is depicted in FIG. 8B, which is discussed below in further detail. Even so, it will be appreciated that the architectures that are illustrated and described herein are not to be taken in a limiting sense and, in other examples, any of a variety of other architectures may be used.

FIG. 8B is a conceptual diagram that depicts an example architecture 850 of a pre-trained generative machine learning model that may be used according to aspects described herein. As noted above, any of a variety of alternative architectures and corresponding ML models may be used in other examples without departing from the aspects described herein.

As illustrated, architecture 850 processes input 802 to produce generative model output 806, aspects of which were discussed above with respect to FIG. 8A. Architecture 850 is depicted as a transformer model that includes encoder 852 and decoder 854. Encoder 852 processes input embedding 858 (aspects of which may be similar to input embedding 810 in FIG. 8A), which includes a sequence of symbol representations that corresponds to input 856. In examples, input 856 includes input content 802 corresponding to a type of content, aspects of which may be similar to input data 111, private content 200, public content 250, first set of content data 302, and/or second set of content data 303.

Further, positional encoding 860 may introduce information about the relative and/or absolute position for tokens of input embedding 858. Similarly, output embedding 874 includes a sequence of symbol representations that correspond to output 872, while positional encoding 876 may similarly introduce information about the relative and/or absolute position for tokens of output embedding 874.

As illustrated, encoder 852 includes example layer 870. It will be appreciated that any number of such layers may be used, and that the depicted architecture is simplified for illustrative purposes. Example layer 870 includes two sub-layers: multi-head attention layer 862 and feed forward layer 866. In examples, a residual connection is included around each layer 862, 866, after which normalization layers 864 and 868, respectively, are included. Decoder 854 includes example layer 890. Similar to encoder 852, any number of such layers may be used in other examples, and the depicted architecture of decoder 854 is simplified for illustrative purposes. As illustrated, example layer 890 includes three sub-layers: masked multi-head attention layer 878, multi-head attention layer 882, and feed forward layer 886. Aspects of multi-head attention layer 882 and feed forward layer 886 may be similar to those discussed above with respect to multi-head attention layer 862 and feed forward layer 866, respectively. Additionally, masked multi-head attention layer 878 performs multi-head attention over the output of encoder 852 (e.g., output 872). In examples, masked multi-head attention layer 878 prevents positions from attending to subsequent positions. Such masking, combined with offsetting the embeddings (e.g., by one position, as illustrated by multi-head attention layer 882), may ensure that a prediction for a given position depends on known output for one or more positions that are less than the given position. As illustrated, residual connections are also included around layers 878, 882, and 886, after which normalization layers 880, 884, and 888, respectively, are included.

Multi-head attention layers 862, 878, and 882 may each linearly project queries, keys, and values using a set of linear projections to a corresponding dimension. Each linear projection may be processed using an attention function (e.g., dot-product or additive attention), thereby yielding n-dimensional output values for each linear projection. The resulting values may be concatenated and once again projected, such that the values are subsequently processed as illustrated in FIG. 8B (e.g., by a corresponding normalization layer 864, 880, or 884).

Feed forward layers 866 and 886 may each be a fully connected feed-forward network, which applies to each position. In examples, feed forward layers 866 and 886 each include a plurality of linear transformations with a rectified linear unit activation in between. In examples, each linear transformation is the same across different positions, while different parameters may be used as compared to other linear transformations of the feed-forward network.

Additionally, aspects of linear transformation 892 may be similar to the linear transformations discussed above with respect to multi-head attention layers 862, 878, and 882, as well as feed forward layers 866 and 886. Softmax 894 may further convert the output of linear transformation 892 to predicted next-token probabilities, as indicated by output probabilities 896. It will be appreciated that the illustrated architecture is provided in as an example and, in other examples, any of a variety of other model architectures may be used in accordance with the disclosed aspects. In some instances, multiple iterations of processing are performed according to the above-described aspects (e.g., using generative model package 804 in FIG. 8A or encoder 852 and decoder 854 in FIG. 8B) to generate a series of output tokens (e.g., words), for example which are then combined to yield a complete sentence (and/or any of a variety of other content). It will be appreciated that other generative models may generate multiple output tokens in a single iteration and may thus used a reduced number of iterations or a single iteration.

Accordingly, output probabilities 896 may thus form embedding output 806 according to aspects described herein, such that the output of the generative ML model (e.g., which may include structured output) is used as input for determining an action according to aspects described herein (e.g., similar to the action determination engine 514 of FIG. 5). In other examples, embedding output 806 is provided as generated output for updating an embedding object memory (e.g., the embedding object memory 310).

Figure 9:
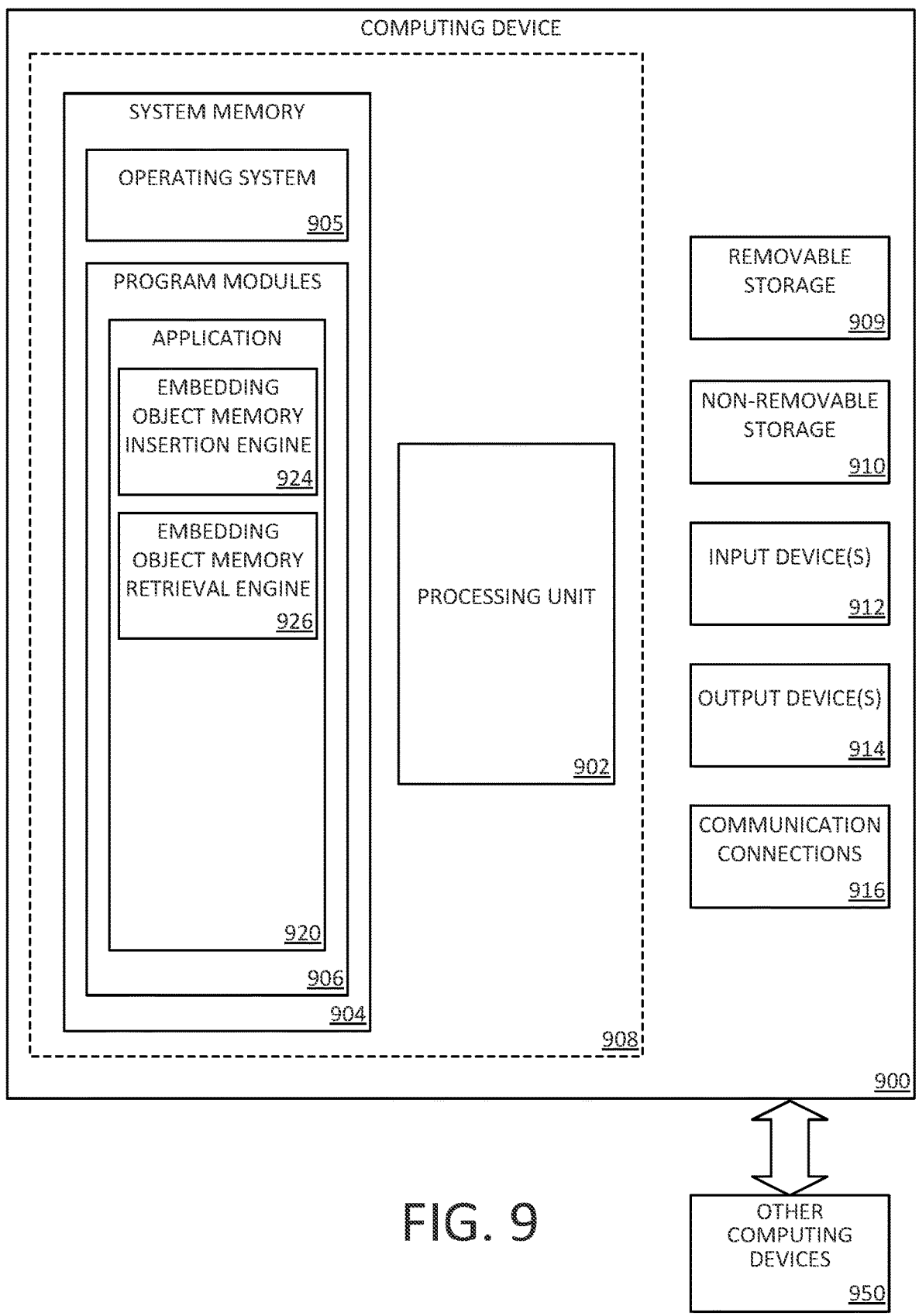
FIG. 9 illustrates a block diagram illustrating example physical components of a computing device with which aspects of the disclosure may be practiced.
Figure 10:
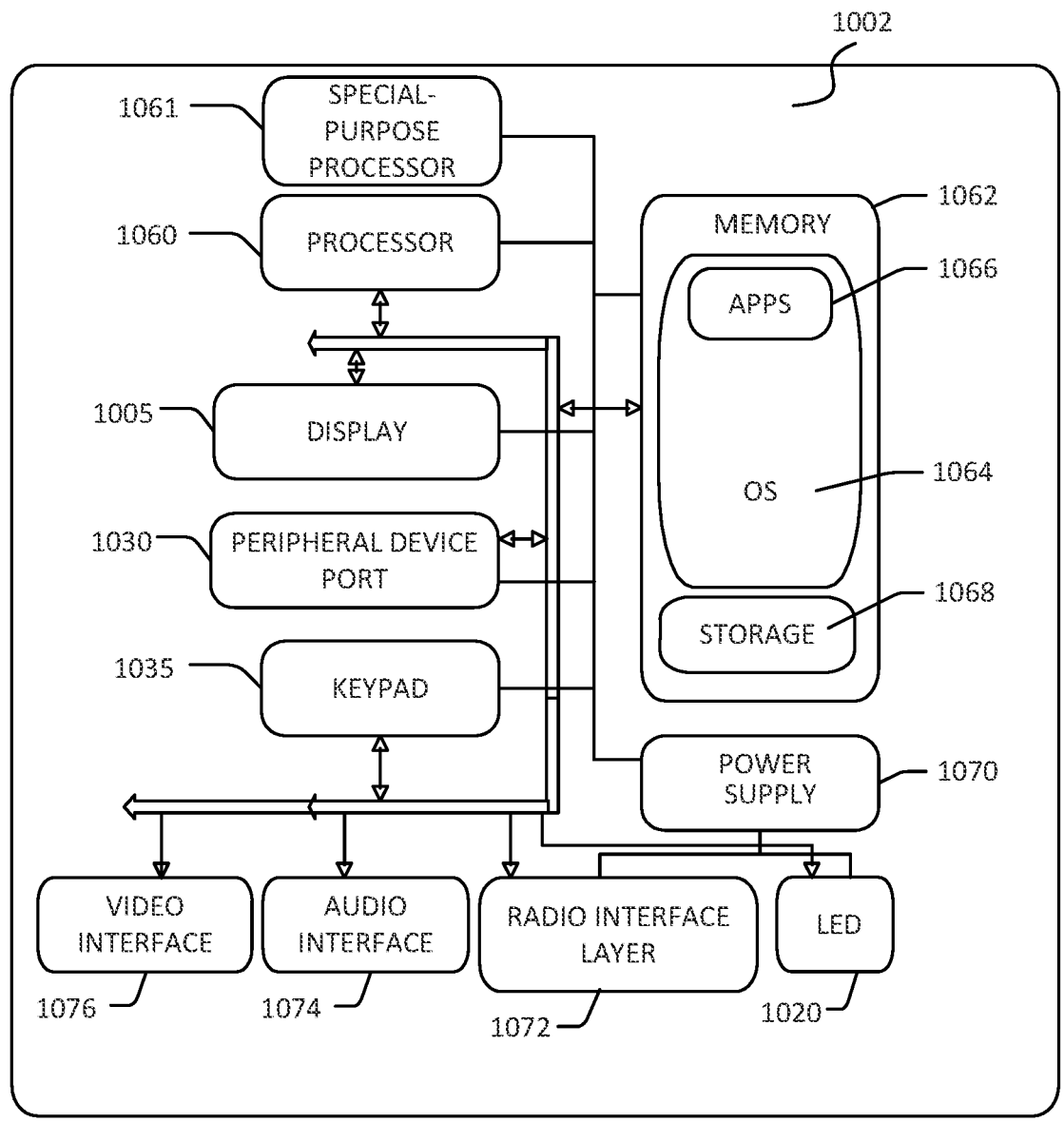
FIG. 10 illustrates a simplified block diagrams of a computing device with which aspects of the present disclosure may be practiced.
Figure 11:
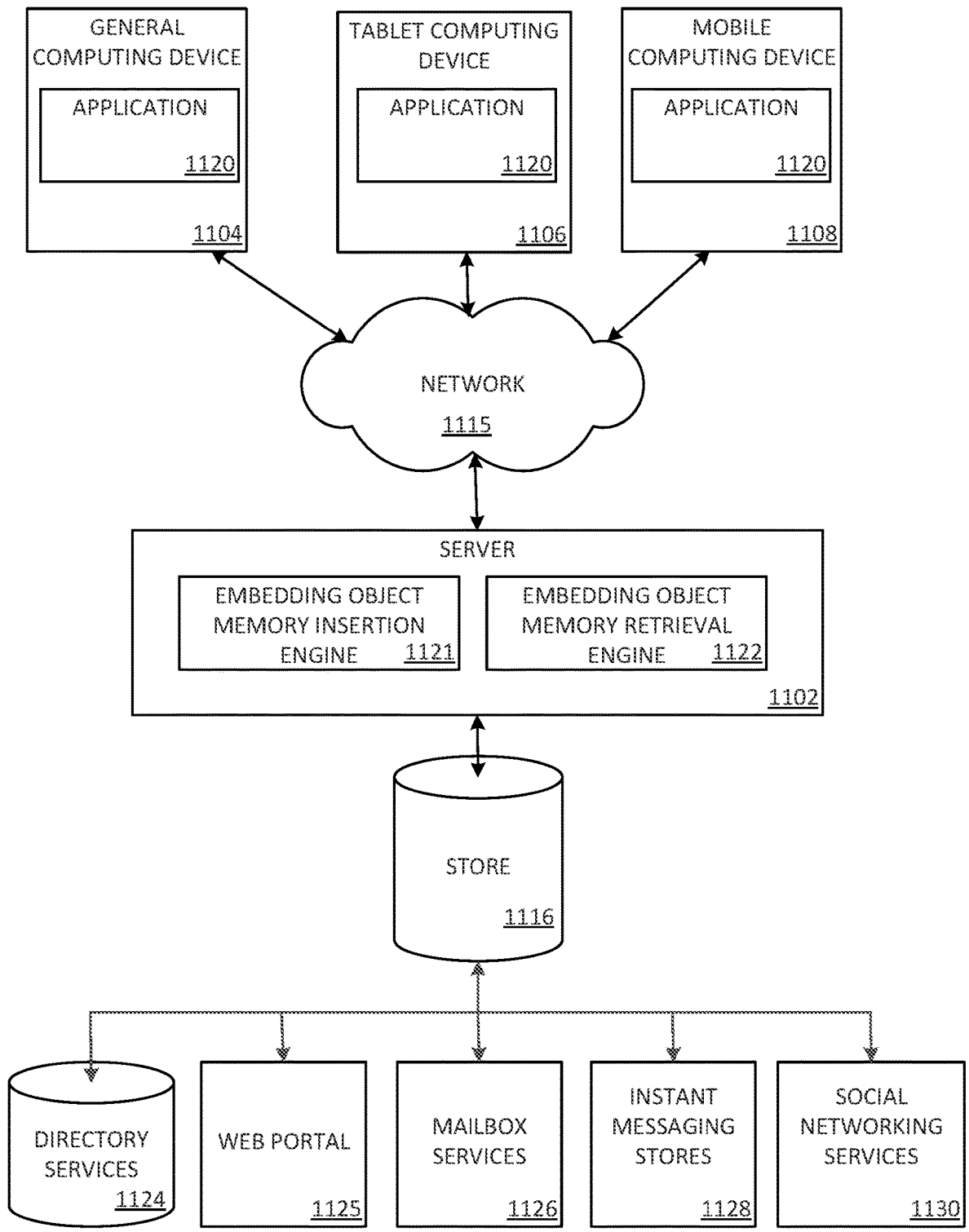
FIG. 11 is a simplified block diagram of a distributed computing system in which aspects of the present disclosure may be practiced.

FIGS. 9-11 and the associated descriptions provide a discussion of a variety of operating environments in which aspects of the disclosure may be practiced. However, the devices and systems illustrated and discussed with respect to FIGS. 9-11 are for purposes of example and illustration and are not limiting of a vast number of computing device configurations that may be utilized for practicing aspects of the disclosure, described herein.

FIG. 9 is a block diagram illustrating physical components (e.g., hardware) of a computing device 900 with which aspects of the disclosure may be practiced. The computing device components described below may be suitable for the computing devices described above, including computing device 102 in FIG. 1. In a basic configuration, the computing device 900 may include at least one processing unit 902 and a system memory 904. Depending on the configuration and type of computing device, the system memory 904 may comprise, but is not limited to, volatile storage (e.g., random access memory), non-volatile storage (e.g., read-only memory), flash memory, or any combination of such memories.

The system memory 904 may include an operating system 905 and one or more program modules 906 suitable for running software application 920, such as one or more components supported by the systems described herein. As examples, system memory 904 may store embedding object memory insertion engine or component 924 and/or embedding object memory retrieval engine or component 926. The operating system 905, for example, may be suitable for controlling the operation of the computing device 900.

Furthermore, aspects of the disclosure may be practiced in conjunction with a graphics library, other operating systems, or any other application program and is not limited to any particular application or system. This basic configuration is illustrated in FIG. 9 by those components within a dashed line 908. The computing device 900 may have additional features or functionality. For example, the computing device 900 may also include additional data storage devices (removable and/or non-removable) such as, for example, magnetic disks, optical disks, or tape. Such additional storage is illustrated in FIG. 9 by a removable storage device 909 and a non-removable storage device 910.

As stated above, a number of program modules and data files may be stored in the system memory 904. While executing on the processing unit 902, the program modules 906 (e.g., application 920) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 9 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 900 on the single integrated circuit (chip). Some aspects of the disclosure may also be practiced using other technologies capable of performing logical operations such as, for example, AND, OR, and NOT, including but not limited to mechanical, optical, fluidic, and quantum technologies. In addition, some aspects of the disclosure may be practiced within a general purpose computer or in any other circuits or systems.

The computing device 900 may also have one or more input device(s) 912 such as a keyboard, a mouse, a pen, a sound or voice input device, a touch or swipe input device, etc. The output device(s) 914 such as a display, speakers, a printer, etc. may also be included. The aforementioned devices are examples and others may be used. The computing device 900 may include one or more communication connections 916 allowing communications with other computing devices 950. Examples of suitable communication connections 916 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 904, the removable storage device 909, and the non-removable storage device 910 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 900. Any such computer storage media may be part of the computing device 900. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIG. 10 is a block diagram illustrating the architecture of one aspect of a computing device. That is, the computing device can incorporate a system (e.g., an architecture) 1002 to implement some aspects. In some examples, the system 1002 is implemented as a "smart phone" capable of running one or more applications (e.g., browser, e-mail, calendaring, contact managers, messaging clients, games, and media clients/players). In some aspects, the system 1002 is integrated as a computing device, such as an integrated personal digital assistant (PDA) and wireless phone.

One or more application programs 1066 may be loaded into the memory 1062 and run on or in association with the operating system 1064. Examples of the application programs include phone dialer programs, e-mail programs, personal information management (PIM) programs, word processing programs, spreadsheet programs, Internet browser programs, messaging programs, and so forth. The system 1002 also includes a non-volatile storage area 1068 within the memory 1062. The non-volatile storage area 1068 may be used to store persistent information that should not be lost if the system 1002 is powered down. The application programs 1066 may use and store information in the non-volatile storage area 1068, such as e-mail or other messages used by an e-mail application, and the like. A synchronization application (not shown) also resides on the system 1002 and is programmed to interact with a corresponding synchronization application resident on a host computer to keep the information stored in the non-volatile storage area 1068 synchronized with corresponding information stored at the host computer. As should be appreciated, other applications may be loaded into the memory 1062 and run on the mobile computing device 1000 described herein (e.g., an embedding object memory insertion engine, an embedding object memory retrieval engine, etc.).

The system 1002 has a power supply 1070, which may be implemented as one or more batteries. The power supply 1070 might further include an external power source, such as an AC adapter or a powered docking cradle that supplements or recharges the batteries.

The system 1002 may also include a radio interface layer 1072 that performs the function of transmitting and receiving radio frequency communications. The radio interface layer 1072 facilitates wireless connectivity between the system 1002 and the "outside world," via a communications carrier or service provider. Transmissions to and from the radio interface layer 1072 are conducted under control of the operating system 1064. In other words, communications received by the radio interface layer 1072 may be disseminated to the application programs 1066 via the operating system 1064, and vice versa.

The visual indicator 1020 may be used to provide visual notifications, and/or an audio interface 1074 may be used for producing audible notifications via the audio transducer 1025. In the illustrated example, the visual indicator 1020 is a light emitting diode (LED) and the audio transducer 1025 is a speaker. These devices may be directly coupled to the power supply 1070 so that when activated, they remain on for a duration dictated by the notification mechanism even though the processor 1060 and/or special-purpose processor 1061 and other components might shut down for conserving battery power. The LED may be programmed to remain on indefinitely until the user takes action to indicate the powered-on status of the device. The audio interface 1074 is used to provide audible signals to and receive audible signals from the user. For example, in addition to being coupled to the audio transducer 1025, the audio interface 1074 may also be coupled to a microphone to receive audible input, such as to facilitate a telephone conversation. In accordance with aspects of the present disclosure, the microphone may also serve as an audio sensor to facilitate control of notifications, as will be described below. The system 1002 may further include a video interface 1076 that enables an operation of an on-board camera 1030 to record still images, video stream, and the like.

A computing device implementing the system 1002 may have additional features or functionality. For example, the computing device may also include additional data storage devices (removable and/or non-removable) such as, magnetic disks, optical disks, or tape. Such additional storage is illustrated in FIG. 10 by the non-volatile storage area 1068.

Data/information generated or captured by the computing device and stored via the system 1002 may be stored locally on the computing device, as described above, or the data may be stored on any number of storage media that may be accessed by the device via the radio interface layer 1072 or via a wired connection between the computing device and a separate computing device associated with the computing device, for example, a server computer in a distributed computing network, such as the Internet. As should be appreciated such data/information may be accessed via the computing device via the radio interface layer 1072 or via a distributed computing network. Similarly, such data/information may be readily transferred between computing devices for storage and use according to well-known data/information transfer and storage means, including electronic mail and collaborative data/information sharing systems.

FIG. 11 illustrates one aspect of the architecture of a system for processing data received at a computing system from a remote source, such as a personal computer 1104, tablet computing device 1106, or mobile computing device 1108, as described above. Content displayed at server device 1102 may be stored in different communication channels or other storage types. For example, various documents may be stored using a directory service 1124, a web portal 1125, a mailbox service 1126, an instant messaging store 1128, or a social networking site 1130.

An application 1120 (e.g., similar to the application 920) may be employed by a client that communicates with server device 1102. Additionally, or alternatively, embedding object memory insertion engine 1121 and/or embedding object memory retrieval engine 1122 may be employed by server device 1102. The server device 1102 may provide data to and from a client computing device such as a personal computer 1104, a tablet computing device 1106 and/or a mobile computing device 1108 (e.g., a smart phone) through a network 1115. By way of example, the computer system described above may be embodied in a personal computer 1104, a tablet computing device 1106 and/or a mobile computing device 1108 (e.g., a smart phone). Any of these examples of the computing devices may obtain content from the store 1116, in addition to receiving graphical data useable to be either pre-processed at a graphic-originating system, or post-processed at a receiving computing system.

As will be understood from the foregoing disclosure, one aspect of the technology relates to a method for storing an entry in an embedding object memory. The method comprises: receiving a content item, the content item having one or more content data; providing one of the content data associated with the content item to one or more semantic embedding models, wherein the one or more semantic embedding models generate one or more semantic embeddings; receiving, from one or more of the semantic embedding models, one or semantic embeddings, wherein a collection of semantic embeddings is associated with a first semantic embedding model of the one or more semantic embedding models, and wherein the collection of semantic embeddings comprises a first semantic embedding generated by the first semantic embedding model for at least one content data from the respective content item; inserting the one or more semantic embeddings into the embedding object memory, wherein the embedding object memory stores one or more semantic embeddings from the collection of semantic embeddings, wherein the one or more semantic embeddings are associated with a respective indication corresponding to a reference to source data associated with the one or more semantic embeddings, and wherein the insertion triggers a spatial storage operation to store a vector representation of the one or more semantic embeddings; and providing the embedding object memory. In some examples, the vector representation is stored in at least one of an approximate nearest neighbor (ANN) tree, a k-d tree, or a multidimensional tree. In some examples, the semantic embedding models comprise a generative large language model (LLM). In some examples, the content data are a plurality of content data that are each a respective one of audio content data, visual content data, gaze content data, weather content data, news content data, calendar content data, email content data, or location content data. In some examples, the embedding object memory is stored at a location that is different than the location of the source data. In some examples, the one or more semantic embedding models comprise a version, wherein each of the semantic embeddings generated by each of the respective models comprise metadata corresponding to the version, and wherein the method further comprises: providing an updated semantic embedding model to replace at least one of the semantic embedding models, the updated semantic embedding model comprising an updated version that is different than the version of the at least one of the semantic embedding models; receiving, from the updated semantic embedding model, an updated one or more semantic embeddings corresponding to the one or more semantic embeddings generated by the at least one of the semantic embedding models; and inserting the updated semantic embeddings in the embedding object memory with metadata corresponding to the updated version. In some examples, the method further comprises: deleting the one or more semantic embeddings corresponding to the updated semantic embeddings, the one or more semantic embeddings having metadata corresponding to a version that is different than the updated version.

In another aspect, the technology relates to a method for retrieving information from an embedding object memory. The method comprises: receiving an input embedding, wherein the input embedding is generated by a machine-learning model; retrieving a plurality of collections of stored semantic embeddings, from the embedding object memory, based on the input embedding, wherein the plurality of collections of stored semantic embeddings each correspond to respective content data; retrieving a subset of semantic embeddings from at least one of the plurality of collections of stored semantic embeddings based on a similarity to the input embedding; determining, based on the subset of semantic embeddings and the input embedding, an action; and providing the action as an output. In some examples, each semantic embedding of the subset of semantic embeddings is associated with source data corresponding to the respective content data, wherein the determining an action comprises: locating the source data; and determining the action based on the input embedding and the source data. In some examples, the source data includes one or more of audio files, text files, or image files. In some examples, the retrieving a subset of embeddings comprises: determining a respective similarity between the input embedding and each embedding of the plurality of collections of stored semantic embeddings; determining an ordered ranking of the one or more similarities or that one or more of the similarities are less than a predetermined threshold; and retrieving the subset of semantic embeddings with similarities to the input embedding that are less than the predetermined threshold or based on the ordered ranking, thereby retrieving subsets of semantic embeddings from at least one of the collections of semantic embeddings that are determined to be related to the input embedding. In some examples, the similarities are distances. In some examples, the method further comprises, prior to receiving the input embedding: receiving user-input; and generating the input embedding based on the user-input. In some examples, the method further comprises adapting a computing device to perform the action.

In a further aspect, the technology relates to a method for inserting entries into and retrieving information from an embedding object memory. The memory comprises: receiving a content item, the content item having one or more content data; providing one of the content data associated with the content item to one or more semantic embedding models, wherein the one or more semantic embedding models generate one or more semantic embeddings; receiving, from one or more of the semantic embedding models, one or more semantic embeddings, wherein a collection of semantic embeddings is associated with a first semantic embedding model of the one or more semantic embedding models, and wherein the collection of semantic embeddings comprises a first semantic embedding generated by the first semantic embedding model for at least one content data from the respective content item; inserting the one or more semantic embeddings into the embedding object memory, wherein the embedding object memory stores one or more semantic embeddings from the collection of semantic embeddings, and wherein the one or more semantic embeddings are associated with a respective indication corresponding to a reference to source data associated with the one or more semantic embeddings; receiving an input embedding; retrieving a plurality of collections of stored semantic embeddings, from the semantic object memory, based on the input embedding; retrieving a subset of semantic embeddings from at least one of the plurality of collections of stored semantic embeddings based on a similarity to the input embedding; and providing the subset of semantic embeddings as an output. In some examples, the one or more semantic embedding models comprise a version, wherein each of the semantic embeddings generated by each of the respective semantic embedding models comprise metadata corresponding to the version, and wherein the plurality of collections of stored semantic embeddings are retrieved based on the metadata corresponding to the version. In some examples, the method further comprises: determining, based on the subset of semantic embeddings and the input embedding, an action; and adapting a computing device to perform the action. In some examples, the retrieving a subset of semantic embeddings comprises: determining a respective similarity between the input embedding and each semantic embedding of the plurality of collections of stored semantic embeddings; determining that one or more of the similarities are less than a predetermined threshold; and retrieving the subset of semantic embeddings with similarities to the input embedding that are less than the predetermined threshold, thereby retrieving subsets of semantic embeddings from at least one of the collections of semantic embeddings that are determined to be related to the input embedding. In some examples, the semantic embedding models comprise a generative large language model (LLM). In some examples, the content data are provided to the one or more semantic embedding models locally or via an application programming interface (API).

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use claimed aspects of the disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method for storing an entry in an embedding object memory, the method comprising:
   receiving a content item, the content item having one or more content data;
   providing one of the content data associated with the content item to one or more semantic embedding models, wherein the one or more semantic embedding models generate one or more semantic embeddings;
   receiving, from one or more of the semantic embedding models, one or more semantic embeddings, wherein a collection of semantic embeddings is associated with a first semantic embedding model of the one or more semantic embedding models, wherein the collection of semantic embeddings comprises a first semantic embedding generated by the first semantic embedding model for at least one content data from the respective content item, wherein the one or more semantic embedding models comprise a version, and wherein each of the semantic embeddings generated by each of the respective one or more semantic embedding models comprise metadata corresponding to the version;
   inserting the one or more semantic embeddings into the embedding object memory, wherein the embedding object memory stores one or more semantic embeddings from the collection of semantic embeddings, wherein the one or more semantic embeddings are associated with a respective indication corresponding to a reference to source data associated with the one or more semantic embeddings, and wherein the insertion triggers a spatial storage operation to store a vector representation of the one or more semantic embeddings;
   providing an updated semantic embedding model to replace at least one of the semantic embedding models, the updated semantic embedding model comprising an updated version that is different than the version of the at least one of the semantic embedding models;
   receiving, from the updated semantic embedding model, an updated one or more semantic embeddings corresponding to the one or more semantic embeddings generated by the at least one of the semantic embedding models, wherein the updated one or more semantic embeddings are generated based on the one of the content data used to generate the one or more semantic embeddings;
   inserting the updated semantic embeddings in the embedding object memory with metadata corresponding to the updated version; and
   providing the embedding object memory.

2. The method of claim 1, wherein the vector representation is stored in at least one of an approximate nearest neighbor (ANN) tree, a k-d tree, or a multidimensional tree.

3. The method of claim 1, wherein the semantic embedding models comprise a generative large language model (LLM).

4. The method of claim 1, wherein the content data are a plurality of content data that are each a respective one of audio content data, visual content data, gaze content data, weather content data, news content data, calendar content data, email content data, or location content data.

5. The method of claim 1, wherein the embedding object memory is stored at a location that is different than the location of the source data.

6. The method of claim 1, further comprising:
   deleting the one or more semantic embeddings corresponding to the updated semantic embeddings, the one or more semantic embeddings having metadata corresponding to a version that is different than the updated version.

7. A method for retrieving information from an embedding object memory, the method comprising:
   receiving an input embedding, wherein the input embedding is generated by a machine-learning model;
   retrieving a plurality of collections of stored semantic embeddings, from the embedding object memory, based on the input embedding, wherein the plurality of collections of stored semantic embeddings each correspond to respective content data;
   retrieving a subset of semantic embeddings from at least one of the plurality of collections of stored semantic embeddings based on a similarity to the input embedding, wherein the subset of semantic embeddings includes a first semantic embedding stored with metadata corresponding to a first version of a semantic embedding model used to generate the first semantic embedding based on a content item, and wherein the subset of semantic embeddings further includes a second semantic embedding stored with metadata corresponding to a second version of the semantic embedding model used to generate the second semantic embedding based on the content item;
   determining, based on the subset of semantic embeddings and the input embedding, an action; and
   providing the action as an output.

8. The method of claim 7, wherein each semantic embedding of the subset of semantic embeddings is associated with source data corresponding to the respective content data, wherein the determining an action comprises:
   locating the source data; and
   determining the action based on the input embedding and the source data.

9. The method of claim 8, wherein the source data includes one or more of audio files, text files, or image files.

10. The method of claim 7, wherein the retrieving a subset of embeddings comprises:
    determining a respective similarity between the input embedding and each embedding of the plurality of collections of stored semantic embeddings;
    determining an ordered ranking of the one or more similarities or that one or more of the similarities are less than a predetermined threshold; and
    retrieving the subset of semantic embeddings with similarities to the input embedding that are less than the predetermined threshold or based on the ordered ranking, thereby retrieving subsets of semantic embeddings from at least one of the collections of semantic embeddings that are determined to be related to the input embedding.

11. The method of claim 10, wherein the similarities are distances.

12. The method of claim 7, further comprising, prior to receiving the input embedding:
receiving user-input; and
generating the input embedding based on the user-input.

13. The method of claim 7, further comprising:
adapting a computing device to perform the action.

14. The method of claim 7, wherein the machine-learning model is a generative multimodal machine-learning model.

15. A method for inserting entries into and retrieving information from an embedding object memory, the method comprising:
receiving a content item, the content item having one or more content data;
providing one of the content data associated with the content item to one or more semantic embedding models, wherein the one or more semantic embedding models generate one or more semantic embeddings;
receiving, from one or more of the semantic embedding models, one or more semantic embeddings, wherein a collection of semantic embeddings is associated with a first semantic embedding model of the one or more semantic embedding models, wherein the collection of semantic embeddings comprises a first semantic embedding generated by the first semantic embedding model for at least one content data from the respective content item, wherein the one or more semantic embedding models comprise a version, and wherein each of the semantic embeddings generated by each of the respective one or more semantic embedding models comprise metadata corresponding to the version;
inserting the one or more semantic embeddings into the embedding object memory, wherein the embedding object memory stores one or more semantic embeddings from the collection of semantic embeddings, and wherein the one or more semantic embeddings are associated with a respective indication corresponding to a reference to source data associated with the one or more semantic embeddings;
providing an updated semantic embedding model to replace at least one of the semantic embedding models, the updated semantic embedding model comprising an updated version that is different than the version of the at least one of the semantic embedding models;
receiving, from the updated semantic embedding model, an updated one or more semantic embeddings corresponding to the one or more semantic embeddings generated by the at least one of the semantic embedding models, wherein the updated one or more semantic embeddings are generated based on the one of the content data used to generate the one or more semantic embeddings;
inserting the updated semantic embeddings in the embedding object memory with metadata corresponding to the updated version;
receiving an input embedding;
retrieving a plurality of collections of stored semantic embeddings, from the semantic object memory, based on the input embedding;
retrieving a subset of semantic embeddings from at least one of the plurality of collections of stored semantic embeddings based on a similarity to the input embedding; and
providing the subset of semantic embeddings as an output.

16. The method of claim 15, wherein the plurality of collections of stored semantic embeddings are retrieved based on the metadata corresponding to the version.

17. The method of claim 15, further comprising:
determining, based on the subset of semantic embeddings and the input embedding, an action; and
adapting a computing device to perform the action.

18. The method of claim 15, wherein the retrieving a subset of semantic embeddings comprises:
determining a respective similarity between the input embedding and each semantic embedding of the plurality of collections of stored semantic embeddings;
determining that one or more of the similarities are less than a predetermined threshold; and
retrieving the subset of semantic embeddings with similarities to the input embedding that are less than the predetermined threshold, thereby retrieving subsets of semantic embeddings from at least one of the collections of semantic embeddings that are determined to be related to the input embedding.

19. The method of claim 15, wherein the semantic embedding models comprise a generative large language model (LLM).

20. The method of claim 15, wherein the content data are provided to the one or more semantic embedding models locally or via an application programming interface (API).

* * * * *